(12) United States Patent
Jaeger

(10) Patent No.: US 10,862,733 B2
(45) Date of Patent: Dec. 8, 2020

(54) STANDARDIZED MICROSERVICES FOR CONTROLLING COMPONENTS OF DISTINCT APPLICATIONS IN MULTI-TENANT CLOUDS

(71) Applicant: Virtustream IP Holding Company LLC, Bethesda, MD (US)

(72) Inventor: Peter Jaeger, Wiesbaden (DE)

(73) Assignee: Virtustream IP Holding Company LLC, Bethesda, MD (US)

( * ) Notice: Subject to any disclaimer, the term of this patent is extended or adjusted under 35 U.S.C. 154(b) by 250 days.

(21) Appl. No.: 16/054,176

(22) Filed: Aug. 3, 2018

(65) Prior Publication Data
US 2018/0367363 A1    Dec. 20, 2018

Related U.S. Application Data

(63) Continuation-in-part of application No. 15/195,159, filed on Jun. 28, 2016.

(51) Int. Cl.
*H04L 12/24* (2006.01)
*H04L 29/08* (2006.01)
(Continued)

(52) U.S. Cl.
CPC ............ *H04L 41/02* (2013.01); *G06F 9/547* (2013.01); *G06F 16/903* (2019.01);
(Continued)

(58) Field of Classification Search
CPC .... H04L 41/0803; H04L 41/022; H04L 47/78
See application file for complete search history.

(56) References Cited

U.S. PATENT DOCUMENTS

2002/0147854 A1* 10/2002 Frazier .................... G06F 9/545
                                                                 719/310
2002/0174107 A1* 11/2002 Poulin ................... G06F 16/951
2016/0094402 A1     3/2016 Finkelstein

OTHER PUBLICATIONS

EMC Corporation, "VCE VXRack System 1000 Series: Hyper-Converged Infrastructure at Scale," The Virtual Computing Environment Company, EMC Converged Platforms, Feb. 17, 2016, 3 pages.

(Continued)

*Primary Examiner* — Philip J Chea
*Assistant Examiner* — Mohammed Ahmed
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement at least a component control layer of a multi-layer application management architecture for a plurality of applications comprising controlled components. The applications are managed at least in part utilizing interactions between the component control layer and an overlying orchestration layer of the multi-layer application management architecture. The component control layer comprises at least one component controller configured to interface with one or more of the controlled components. The component controller is implemented as an application management microservice presenting a standardized application programming interface to the orchestration layer. Different instances of the component controller are illustratively utilized by respective ones of at least first and second different configuration management systems associated with the orchestration layer.

20 Claims, 27 Drawing Sheets

(51) Int. Cl.
 *G06F 9/54* (2006.01)
 *G06F 16/903* (2019.01)
(52) U.S. Cl.
 CPC .......... *H04L 41/022* (2013.01); *H04L 41/044* (2013.01); *H04L 41/0803* (2013.01); *H04L 67/28* (2013.01)

(56) References Cited

OTHER PUBLICATIONS sysdig.org, "Universal System Visibility with Native Container Support," 2015, 3 pages.
W. Felter et al., "An Updated Performance Comparison of Virtual Machines and Linux Containers," IBM Research Report, RC25482, Jul. 21, 2014, 15 pages.
EMC Corporation, "Vblock FastPath Desktop Virtualization Platform: Modernize Your Desktop with a Purpose-Built Desktop Virtualization Solution," The Virtual Computing Environment Company, vmware, 2011, 2 pages.
B. Hindman et al., "Mesos: A Platform for Fine-Grained Resource Sharing in the Data Center," Proceedings of the 8th USENIX Conference on Networked Systems Design and Implementation (NSDI), Mar.-Apr. 2011, pp. 295-308.
wordpress.com, "Virtustream xStream with App Director Service Module for SAP," The SAP Data Center of the Future, Apr. 14, 2016, 5 pages.
U.S. Appl. No. 15/195,159 filed in the name of Peter Jaeger on Jun. 28, 2016, and entitled "Multi-Layer Application Management Architecture for Cloud-Based Information Processing Systems.".
Solarwinds Worldwide, LLC, "Application Stack Management Bundle: Pinpoint the Root Cause of Application Problems in Seconds," http://www.solarwinds.com/application-server-management-software, 2016, 4 pages.
Zoho Corporation, "ManageEngine Applications Manager-Fact Sheet," https://download.manageengine.com/products/applications_manager/meam_fact_sheet.pdf, 2016, 4 pages.
The Apache Software Foundation, "Apache CloudStack: About," https://cloudstack.apache.org/about.html, 2016, 1 page.
Kaavo, "Application-Centric Cloud Resource Management," IMOD Data Sheet, http://docs.kaavo.com/Kaavo-IMOD-Fact-Sheet.pdf, 2011, 2 pages.
Morpheus Data, LLC, "Cloud Application Management for Today's Technology Leader," https://morpheus-v2-marketing-production.s3.amazonaws.com/system/SpudMedia/216/attachment/Morpheus_Overview_original.pdf, Jul. 8, 2016, 2 pages.
Rightscale, Inc., "RightScale Technical Overview," http://assets.rightscale.com/uploads/pdfs/RightScale-Technical-overview.pdf, 2014, 11 pages.
Activeeon, "ProActive Cloud Automation: Your Open Automation Platform, Product Sheet," http://www.activeeon.com/resources/activeeon-productsheet-proactive-cloud-automation-en.pdf, 2016, 2 pages.
Vmware, "VMware vRealize Orchestrator: Executing Complex IT Operations Faster and at Lower Cost," Datasheet, https://www.vmware.com/content/dam/digitalmarketing/vmware/en/pdf/products/vrealize/vmware-vrealize-orchestrator.pdf, Sep. 2014, 2 pages.
The Apache Software Foundation, "The Theory Behind Brooklyn," https://brooklyn.apache.org/learnmore/theory.html, 2016, 4 pages.
The Apache Software Foundation, "Apache Provisionr," http://provisionr.incubator.apache.org/index.html, 2013, 1 page.
J. Cammarata, "About Cobbler," http://cobbler.github.io/about.html, 2016, 3 pages.
Canonical Ltd., "What is Juju?," https://jujucharms.com/docs/stable/about-juju, 2016, 6 pages.
Saltstack Inc., "SaltStack Orchestration & Automation for CloudOps, ITops & DevOps at Scale," https://saltstack.com/enterprise/, 2016, 3 pages.
Empirius Gmbh, "Technical Whitepaper: BlueSystemCopy for SAP," http://empirius.de/en/products/blue-systemcopy-systemcopies-automatic-and-optimized.html, Aug. 2016. 17 pages.
Libelle AG, "Libelle SystemCopy: Automated and Optimized System Copies for SAP Applications," Fact Sheet, http://www.libelle.com/fileadmin/Public/Whitepaper/FactSheet_Libelle_SystemCopy_EN.pdf, Apr. 2015, 4 pages.
Cloud Foundry Foundation, "Cloud Foundry Overview," https://docs.cloudfoundry.org/concepts/overview.html, Jul. 27, 2016, 4 pages.
Heroku Dev Center, "How Heroku Works," https://devcenter.heroku.com/articles/how-heroku-works#defining-an -application, Aug. 26, 2016, 10 pages.
Apcera Inc., "How Apcera Works," http://docs.apcera.com/introduction/apcera-usage/, Nov. 4, 2015, 4 pages.
Kubernetes, "What is Kubernetes?," http://kubernetes.io/docs/whatisk8s/, 2016, 6 pages.
Usharesoft, "UForge for Cloud Service Providers Scale. Differentiate. Make Money. Solution Sheet," https://www.usharesoft.com/resources/datasheets/uforge-cloud-providers.pdf, 2014, 2 pages.
Gigaspaces Technologies, "What is Cloudify?," http://docs/getcloudify.org/3.3.1/intro/what-is-cloudify/, 2016, 2 pages.
Cliqr Technologies, "CloudCenter Features," http://docs.cliqr.com/display/CCD42/Features, 2016, 2 pages.
Red Hat, Inc., "Ansible Tower User Guide v3.0.1," https://docs.ansible.com/ansible-tower/latest/html/userguide/overview.html, 2016, 3 pages.
Chef Software Inc., "Chef" DataSheet, https://pages.chef.io/rs/255-VFB-268/images/chef-datasheet.pdf, Jun. 2016, 2 pages.
Cfengine, "Introduction and System Overview," https://docs.cfengine.com/lts/guide-introduction.html, Sep. 28, 2016, 5 pages.
Incontinuum, "Automated Cloud Orchestration," http://incontinuum.incontinuumsoftw.netdna-cdn.com/wp-content/uploads/2016/07/CloudController-EN-1606-BROCHURE.pdf, Jun. 2016, 4 pages.
Apprenda Inc., "What is Apprenda, Logically Speaking?" http://docs.apprenda.com/print/book/export/html/976, 2016, 4 pages.
Fluid Operations AG, "Next Generation Cloud Management," https://www.fluidops.com/en/company/post?s=2016-03-30-new-paper-available-next-generation-cloud-management, Mar. 30, 2016, 12 pages.
Vmware, Inc., "VMware vCloud Air: Service Description," Datasheet, http://www.vmware.com/content/dam/digitalmarketing/vmware/en/pdf/product/vcloud-air/vmware-vcloud-air-datasheet.pdf, 2015, 4 pages.
Red Hat, Inc., "Openshift Enterprise 3.1 by Red Hat," Datasheet, https://www.openshift.com/sites/default/files/rhc-openshift-enterprise-paas-datasheet.pdf, 2015, 2 pages.
IBM Corporation Software Group, "Simplifying Cloud Management and Data Center Automation," Thought Leadership White Paper, http://www-03.ibm.com/software/products/en/ibm-cloud-orchestrator, Apr. 2014, 6 pages.
Rackspace US, Inc., "Why Rackspace: More Than a Hosting Provider. We're your Trusted Service Partner," https://www.rackspace.com/why-rackspace, 2016, 6 pages.
Hashicorp, "DevOps and The Future of Infrastructure," https://www.hashicorp.com/index.html#products, 2016, 10 pages.
C3DNA Inc., "The C3DNA Platform," http://c3dna.com/product.html, 2014, 5 pages.
IT-Conductor Inc., "Application Performance Management as Service," http://itconductor.com/, 2016, 7 pages.
Elasticbox, "Adaptive Cloud Application Delivery," https://elasticbox.com/how-it-works, 2016, 5 pages.
Hashicorp, "Why Vagrant?," https://www.vagrantup.com/docs/why-vagrant/, Jan. 19, 2016, 3 pages.
Hewlett Packard Enterprise Development LP, "Eucalyptus 4.3.0 User Guide," https://docs.eucalyptus.com/eucalyptus/4.3.0/, Sep. 23, 2016, 127 pages.
Puppet, "Explore the Value of Puppet Enterprise," https://puppet.com/resources/data-sheet/explore-value-of-puppet-enterprise, 2016, 2 pages.
Rackspace US, Inc., "Welcome to the Heat Documentation!," OpenStack Heat, http://docs.openstack.org/developer/heat, 2013, 5 pages.

(56) References Cited

OTHER PUBLICATIONS

SAP, "Soft Shutdown in SAP Application Server," SAP NetWeaver 7.3 EHP1 Documentation, https://help.sap.com/saphelp_nw73ehp1/helpdata/en/f7/cb8577bc244a25a994fc3f9c16ce66/frameset.htm, Nov. 2016, 5 pages.

U.S. Appl. No. 15/669,608 filed in the name of Peter Jaeger on Aug. 4, 2017, and entitled "Configurable Startup, Shutdown, Reboot and Isolation for Applications in Cloud-Based Information Processing Systems.".

json-schema.org, "JSON Schema," http://json-schema.org/, 2007, 2 pages.

iana.org, "Link Relations," https://www.iana.org/assignments/link-relations/link-relations.xhtml, Oct. 26, 2017, 12 pages.

R. Fielding et al., "Hypertext Transfer Protocol—HTTP/1.1—Section 10—Status Code Definitions," Network Working Group, Request for Comments: 2616, Jun. 1999, 19 pages.

apache.org, "Apache Commons—Apache Commons," http://commons.apache.org/, Jun. 3, 2018, 4 pages.

Pivotal Software, Inc., "Spring One Platform," http://spring.io/, 2018, 6 pages.

raml.org, "RAML Version 1.0: RESTful API Modeling Language," https://github.com/raml-org/raml-spec/blob/master/versions/raml-10/raml-10.md/, retrieved Aug. 3, 2018, 69 pages.

saltstack.com, "Salt Proxy Minion," https://docs.saltstack.com/en/latest/topics/proxyminion/index.html, Aug. 3, 2018, 17 pages.

SAP Netweaver Server Infrastructure, "How to Use the SAPControl Web Service Interface," https://www.sap.com/documents/2016/09/0a40e60d-8b7c-0010-82c7-eda71af511fa.html, Oct. 21, 2016, 61 pages.

Oracle Enterprise Manager, "Enterprise Manager—Database as a Service—RST API Cookbook," http://www.oracle.com/technetwork/oem/cloud-mgmt/dbaas-api-cookbook-030116-2925990.pdf, Feb. 29, 2016, 30 pages.

Saltstack, Inc., "Salt Documentation—Release 2018.3.2," https://saltstack.com/, Jul. 16, 2018, 900 pages.

\* cited by examiner

TYPE API

/schemas
/types
  /{xuc_type_id}
    /actions
      /{action_id}
    /components
/catalog returns information about the implemented XuC types, actions and related data types

QUERY API

/types/<specific type>/instances
  /{instance_id}
    /components
      /{component type}
    /actions queries properties, states, components and available actions of things under control

ACTION API

/types/<specific type>/instances
  /{instance_id}
    /actions/<specific action>/exec allows actions against things under control

FIG. 9

```
[{"item": "T1",
  "links": [{
    "rel": "self",
    "method": "GET",
    "href": "http://<controller endpoint>/types/T1"
  },{
    "rel": "schema",
    "method": "GET",
    "href": "http://<controller endpoint>/schemas/<schema>.json"
  },{
    "rel": "data-type",
    "$ref": "<schema>.json#/t_types"
  },{
    "rel": "instance-data-type",
    "$ref": "<schema>.json#/i_t1"
  },{
    "rel": "actions",
    "method": "GET",
    "href": "http://<controller endpoint>/types/T1/actions"
  },{
    "rel": "components",
    "method": "GET",
    "href": "http://<controller endpoint>/types/T1/components"
  }]
},
{"item": "T2",
  "links": [{
    "rel": "self",
    "method": "GET",
    "href": "http://<controller endpoint>/types/T2"
  },{
    "rel": "schema",
    "method": "GET",
    "href": "http://<controller endpoint>/schemas/<schema>.json"
  },{
    "rel": "data-type",
    "$ref": "<schema>.json#/t_types"
  },{
    "rel": "instance-data-type",
    "$ref": "<schema>.json#/i_t2"
  },{
    "rel": "actions",
    "method": "GET",
    "href": "http://<controller endpoint>/types/T2/actions"
  },{
    "rel": "components",
    "method": "GET",
    "href": "http://<controller endpoint>/types/T2/components"
  }]
}]
```

FIG. 13

```
{"description": "<description of the type T1 as text>",
 "attr": "<value>",
 ...
 "links": [
   {
     "rel": "schema",
     "method": "GET",
     "href": "http://<service>/schemas/<schema>.json"
   },
   {
     "rel": "data-type",
     "$ref": "<schema>.json#/_types"
   },
   {
     "rel": "instance-data-type",
     "$ref": "<schema>.json#/_T1"
   },
   {
     "rel": "actions",
     "method": "GET",
     "href": "http://<controller endpoint>/types/T1/actions"
   },
   {
     "rel": "actions",
     "method": "GET",
     "href": "http://<controller endpoint>/types/T1/actions"
   },
   {
     "rel": "components",
     "method": "GET",
     "href": "http://<controller endpoint>/types/T1/components"
   },
   ...
 ],
 ...
}
```

```
{"attr1": "value1",
 "attr2": "value2",
 ...
 "links":[{
   "rel": "type",
   "method": "GET",
   "href": "http://<service>/types/T"
  },{
   "rel": "schema",
   "method": "GET",
   "href": "http://<controller endpoint>/schemas/<schema>.json"
  },{
   "rel": "data-type",
   "$ref": "<schema>.json#/t_1"
  },{
   "rel": "self",
   "method": "GET",
   "href": "http://<service>/types/T/instances/1234"
  },{
   "rel": "actions",
   "method": "GET",
   "href": "http://<controller endpoint>/types/T/instances/1234/actions"
  },{
   "rel": "components",
   "method": "GET",
   "href": "http://<controller endpoint>/types/T/instances/1234/components"
  }]
}
```

```
{"action":"A",
 "display name":"<display name of action A>",
 "description":"description of action A",
 "pre_condition":"<pre condition of action A>",
 "post_condition":"<post condition of action A>",
 "input_data_type":"_action_a_input",
 "output_data_type":"_action_a_output",
 "links":[{
    "rel":"type",
    "href":"http://<service>/types/T/actions/A"
  },{
    "rel":"self",
    "method":"GET",
    "href":"http://<service>/types/T/instances/1234/actions/A"
  },{
    "rel":"schema",
    "method":"GET",
    "href":"http://<controller endpoint>/schemas/<schema>.json"
  },{
    "rel":"data-type",
    "$ref":"<schema>.json#/t_action_descriptor"
  },{
    "rel":"executedBy",
    "method":"POST",
    "href":"http://<service>/types/T/instances/1234/actions/A/exec"
  }]
}
```

FIG. 18

```
control1001.n:SAPSystem.S01.sapcontrol.prot
control1001.v:http
control1002.n:SAPSystem.S01.sapcontrol.server
control1002.v:s00001
control1003.n:SAPSystem.S01.sapcontrol.user
control1003.v:s01adm
control1004.n:SAPSystem.S01.sapcontrol.password
control1004.v:somepassword
control1005.n:SAPSystem.S01.sapcontrol.instnum
control1005.v:00
control1006.n:SAPSystem.S01.sapjco.client
control1006.v:000
control1007.n:SAPSystem.S01.sapjco.server
control1007.v:s00001
control1008.n:SAPSystem.S01.sapjco.user
control1008.v:SAP*
control1009.n:SAPSystem.S01.sapjco.password
control1009.v:somepassword
control1010.n:SAPSystem.S01.sapjco.instnum
control1010.v:00
```

FIG. 19

```
proxy:
  proxytype: appcontrol
  url: http://127.0.0.1:8080/appcontrol/v1/
  cacheexpiration: 30
appcontrol:
  DBSystem:
    HDB:
      sql:
        server: 10.100.252.115
        user: SYSTEM
        password: "vault:/secret/Database/HDB.SYSTEM"
        prot: "jdbc:sap"
        instnum: "00"
      sapcontrol:
        server: 10.100.252.115
        user: hdbadm
        password: "vault:/secret/Linux/hdadb.hdbadm"
        prot: http
        instnum: "00"
  SAPSystem:
    HS1:
      sapcontrol:
        server: 10.100.252.116
        instnum: "00"
        prot: http
        user: hs1adm
        password: "vault:/secret/Linux/paivdt.hs1adm"
      sapjco:
        server: 10.100.252.116
        client: "000"
        user: SAP*
        password: "vault:/secret/SAP/HS1.000.SAP*"
        instnum: "00"
```

FIG. 22

```
# salt 'p0001' appcontrol.types
p0001:
  - SAPSystem
  - SAPSystemInst
  - DBSystem
  - DBSystemInst
  - ABAPClient
  - SQLUser
```

FIG. 23

```
# salt 'p0001' appcontrol.instances SAPSystem
p0001:
  - HS1
```

```
# salt 'p0001' appcontrol.instances DBSystem
p0001:
  - HDB
```

FIG. 24

```
# salt 'p0001' appcontrol.components SAPSystem
p0001:
  - SAPSystemInst
  - DBSystem
  - ABAPClient
```

```
# salt 'p0001' appcontrol.components DBSystem
p0001:
  - DBSystemInst
  - SQLUser
```

FIG. 25

```
# salt 'p0001' appcontrol.instance_component_types SAPSystem 301
p0001:
  - SAPSystemInst
  - DBSystem
```

FIG. 26

```
# salt 'p0001' appcontrol.instance_components SAPSystem HS1 SAPSystemInst
p0001:
  - HS1:aaivdt:00
  - HS1:scsvdt:00
  - HS1:ersvdt:10
  - HS1:paivdt:00
```

```
# salt 'p0001' appcontrol.instance_components SAPSystem HS1 ABAPClient
p0001:
  - HS1:000
  - HS1:001
  - HS1:066
```

FIG. 27

```
# salt 'p0001' appcontrol.instance_data DBSystem HDB
p0001:
    ----------
    db_sid:
        HDB
    license:
        ----------
        end_date:
            None
        license_key:
            None
        links:
        permanent:
            True
    ... rest omitted for brevity
    state:
        RUNNING
```

FIG. 28

STANDARDIZED MICROSERVICES FOR CONTROLLING COMPONENTS OF DISTINCT APPLICATIONS IN MULTI-TENANT CLOUDS

RELATED APPLICATIONS

The present application is a continuation-in-part of U.S. patent application Ser. No. 15/195,159, filed Jun. 28, 2016, now U.S. Pat. No. 10,326,845, and entitled "Multi-Layer Application Management Architecture for Cloud-Based Information Processing Systems," which is incorporated by reference herein in its entirety. The present application is also related to U.S. patent application Ser. No. 15/669,608, filed Aug. 4, 2017, now U.S. Pat. No. 10,437,605, and entitled Configurable Startup, Shutdown, Reboot and Isolation for Applications in Cloud-Based Information Processing Systems," which is also incorporated by reference herein in its entirety.

FIELD

The field relates generally to information processing systems, and more particularly to techniques for managing applications in cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given cloud-based information processing system. However, significant challenges can arise in the management of large numbers of applications in cloud-based information processing systems. For example, coordination of multiple distinct applications on behalf of each of multiple tenants across a hybrid multi-tenant cloud can be particularly challenging when using conventional arrangements. Accordingly, a need exists for improved management of applications in hybrid multi-tenant clouds as well as other types of cloud-based information processing systems. More particularly, simplification of component control in distinct applications potentially associated with different configuration management systems would be highly beneficial.

SUMMARY

Illustrative embodiments of the present invention provide standardized microservices for controlling components of distinct applications in multi-layer application management architectures of cloud-based information processing systems. Such microservices are well-suited for use with hybrid multi-tenant clouds and numerous other types of cloud-based information processing systems.

In one embodiment, an apparatus comprises a processing platform that includes a plurality of processing devices each comprising a processor coupled to a memory. The processing platform is configured to implement at least a component control layer of a multi-layer application management architecture for a plurality of applications comprising controlled components. The applications are managed at least in part utilizing interactions between the component control layer and an overlying orchestration layer of the multi-layer application management architecture. The component control layer comprises at least one component controller configured to interface with one or more of the controlled components. The component controller is implemented as an application management microservice presenting a standardized application programming interface (API) to the orchestration layer.

Different instances of the component controller are illustratively utilized by respective ones of at least first and second different configuration management systems associated with the orchestration layer. At least one of the configuration management systems may comprise a Salt-based configuration management system. Numerous other types of configuration management systems can be similarly supported by the component controller implemented as an application management microservice.

The component controller in some embodiments is remotely accessible from one or more other processing platforms via a service proxy.

Different instances of the same controlled component for distinct applications are illustratively controlled utilizing respective corresponding instances of the component controller.

The standardized API of the application management microservice implementing the component controller is configured in some embodiments to permit queries on state and configuration of the one or more controlled components and execution of actions against the one or more controlled components.

As another example, the standardized API of the application management microservice implementing the component controller illustratively comprises multiple distinct portions, including a type API configured to return type information characterizing the one or more controlled components, a query API configured to query state information and available actions for the one or more controlled components, and an action API configured to allow actions against the one or more controlled components.

The actions that can be executed against the one or more controlled components are illustratively selected from a structurally homogeneous action library comprising actions accessible to the component controller.

The component controller in some embodiments is implemented as a stateless controller configured via its standardized API to provide the orchestration layer with visibility into state information of the one or more controlled components in a standardized manner.

In some embodiments, the component control layer comprises multiple distinct component controllers. For example, the component control layer may comprise at least first and second distinct component controllers configured to interface with respective first and second distinct sets of controlled components with each set comprising one or more of the controlled components. The first and second component controllers in such an embodiment are implemented as respective application management microservices each presenting a standardized API to the orchestration layer. The first and second sets of controlled components can comprise, for example, respective first and second distinct applications, or respective different portions of a given one of the applications.

Illustrative embodiments can provide significant advantages relative to conventional arrangements. For example, provision of effective and flexible component control for multiple distinct applications of multiple tenants in hybrid multi-tenant clouds is considerably simplified through the use of component controllers implemented as respective application management microservices each presenting a standardized API to an overlying orchestration layer as disclosed herein.

Moreover, such standardization of application management microservices for component control facilitates development of component controllers by different organizations and/or subject matter expert groups.

These and other illustrative embodiments described herein include, without limitation, methods, apparatus, systems, and computer program products comprising processor-readable storage media.

BRIEF DESCRIPTION OF THE DRAWINGS

FIG. 9 illustrates separate type, query and action APIs within a component controller.

FIGS. 13 through 18 show examples of query results in illustrative embodiments.

FIG. 19 shows an example of a control scope of a system under control in an illustrative embodiment.

FIGS. 22 through 28 illustrate example features of an embodiment implemented using a Salt-based configuration management system.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

In the following description, the term "landscape" should be understood to refer to a set of systems.

Also, the term "application management domain" as used herein is intended to be broadly construed so as to encompass a set of "things under control" that are controlled by a controller of an application manager.

Figure 1:
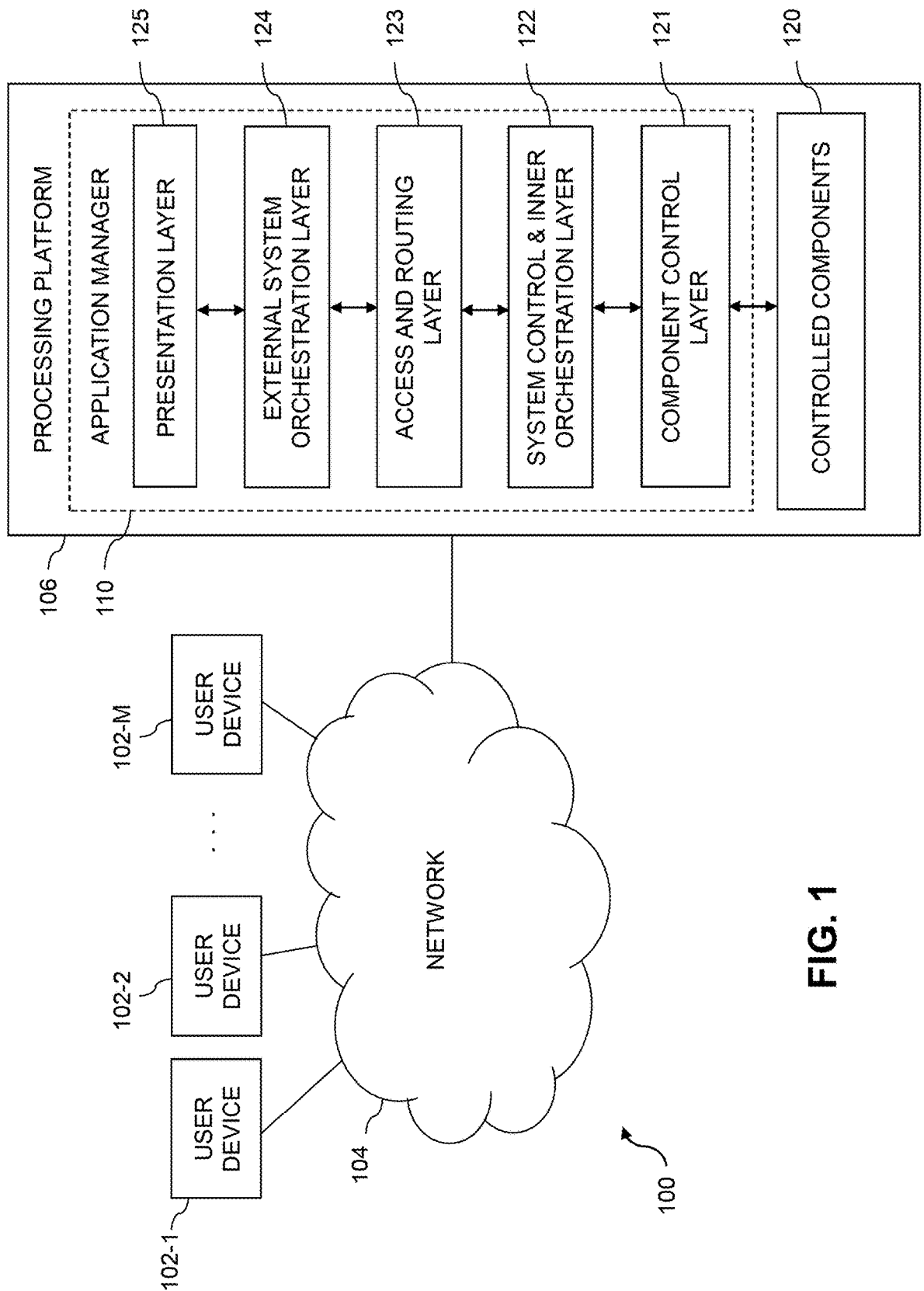
FIG. 1 is a block diagram of an information processing system comprising an application manager configured in accordance with a multi-layer application management architecture in an illustrative embodiment.

FIG. 1 shows an information processing system 100 configured in accordance with an illustrative embodiment of the present invention. The information processing system 100 comprises a plurality of user devices 102-1, 102-2, ... 102-M coupled via a network 104 to a processing platform 106.

The user devices 102 in this embodiment can comprise, for example, desktop, laptop or tablet computers, mobile telephones, or other types of processing devices capable of communicating with the processing platform 106 over the network 104. Users associated with the respective user devices 102 are assumed to run respective sets of applications utilizing corresponding sets of virtual resources of at least one cloud-based system provided by the processing platform 106. For example, such users may be respective tenants of a cloud data center or other type of multi-tenant environment provided by the processing platform 106. These tenants are examples of what are more generally referred to herein as respective "users" of the processing platform 106. Tenants or other users may also be referred to as "customers" of a cloud service provider.

In some embodiments, the virtual resources comprise a plurality of containers allocable to respective applications under the control of the cloud-based system. Additional or alternative virtual resources that may be used in a given embodiment include virtual machines. For example, the virtual resources may comprise a plurality of virtual machines allocable to the applications under the control of the cloud-based system. Various combinations of containers, virtual machines and other virtual resources may be used in other embodiments. For example, virtual resources may comprise containers running in virtual machines.

The network 104 over which the user devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processing platform 106 is assumed to include a plurality of processing devices each having a processor coupled to a memory, and is configured to implement the virtual resources of the cloud-based system for use by applications.

By way of example, the processing platform 106 can be implemented at least in part utilizing converged infrastructure. Such converged infrastructure may comprise at least portions of VxRail™, VxRack™, VxRack™ FLEX, VxBlock™, or Vblock® converged infrastructure from VCE, the Virtual Computing Environment Company, now the Converged Platform and Solutions Division of Dell EMC.

As indicated above, the processing platform 106 in the present embodiment is assumed to implement at least one cloud-based system. Such a cloud-based system is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The processing platform 106 in the present embodiment is more particularly configured to implement virtual resources of one or more clouds for use by applications of at least one application management domain (AMD). The processing platform 106 further comprises an application manager 110 configured in accordance with a multi-layer application management architecture. The application manager 110 manages controlled components 120 that illustratively include respective ones of the virtual resources and applications. The multi-layer application management architecture of the application manager 110 in this embodiment includes at least a component control layer 121, a system control and inner orchestration layer 122, an access and routing layer 123, an external system orchestration layer 124, and a presentation layer 125, although it is to be appreciated that additional or alternative layers can be used in other embodiments.

The controlled components 120 comprising virtual resources and applications are under control of the component control layer 121. In addition, the applications are managed utilizing interactions between the layers of the multi-layer application management architecture of the application manager 110.

The virtual resources of the controlled components 120 illustratively comprise compute, storage and network resources associated with one or more host devices. Such host devices are examples of what are more generally referred to herein as "processing devices."

Figure 6:
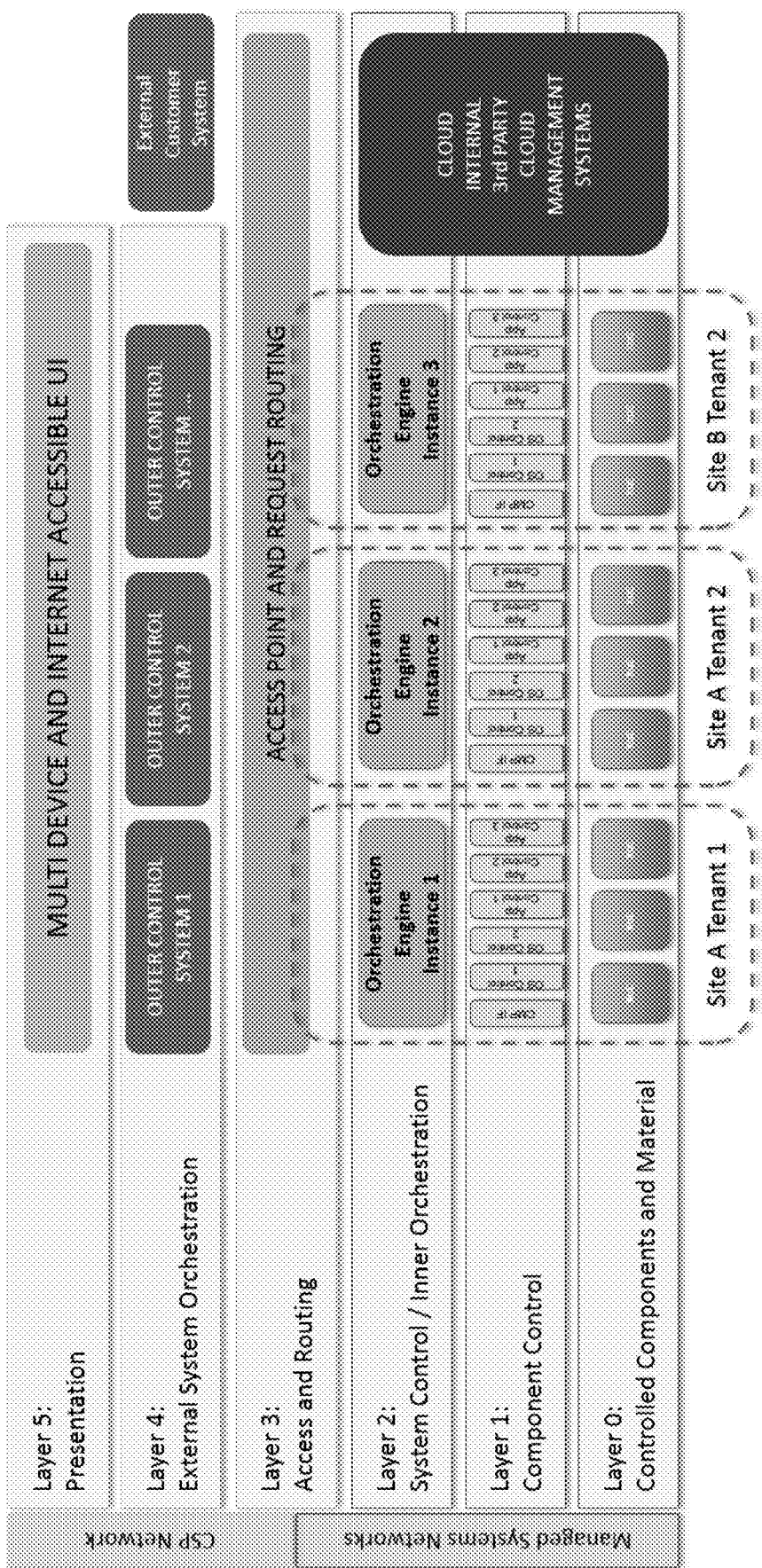
FIG. 6 shows a multi-layer application management architecture in an illustrative embodiment.

An example of the controlled components 120 is shown in FIG. 6 and denoted as Layer 0 associated with a multi-layer application management architecture comprising Layers 1 through 5 that overlay Layer 0.

Although it is assumed in this embodiment that controlled components 120 and hence Layer 0 are not part of the multi-layer application management architecture, in other embodiments the controlled components 120 and Layer 0 may be considered part of that architecture.

The component control layer 121 illustratively comprises at least one infrastructure controller configured to control the compute, storage and network resources, at least one operating system (OS) controller configured to control an operating system of at least one of the host devices, and a plurality of application controllers configured to control respective ones of the applications. An example of the component control layer 121 is Layer 1 of FIG. 6.

The virtual resources may comprise different sets of compute, storage and network resources for different ones of a plurality of clouds and the component control layer 121 may comprise a separate infrastructure controller for each of the different clouds.

In addition, at least a subset of the infrastructure controllers, operating system controllers and application controllers of the component control layer 121 may each be configured to permit execution of actions on its associated controlled components via an application programming interface (API).

The system control and inner orchestration layer 122 illustratively comprises a plurality of system model instances implemented for respective ones of a plurality of tenants of at least one of the clouds. An example of the system control and inner orchestration layer 122 is Layer 2 of FIG. 6.

The system control and inner orchestration layer 122 further comprises at least one inner orchestration engine configured to interact with a plurality of controllers of the component control layer 121 in order to provide services that utilize controlled components 120 of at least one system under control. An example of such an arrangement will be described below in conjunction with FIG. 16. The inner orchestration engine is configured to operate in accordance with a corresponding system model instance. The inner orchestration engine illustratively further comprises or is otherwise associated with a credentials provider configured to store credentials required to access controlled components 120 within a particular AMD of the inner orchestration engine. The system control and inner orchestration layer may comprise a plurality of inner orchestration engines each associated with a different one of a plurality of AMDs.

The access and routing layer 123 illustratively comprises at least one API access point, a request scheduler and a request router. The access and routing layer 123 implements a set of functions for executing operations in the system control and inner orchestration layer 122 on behalf of different tenants associated with different AMDs each having a different inner orchestration engine within the system control and inner orchestration layer 122. An example of the access and routing layer 123 is Layer 3 of FIG. 6.

The external system orchestration layer 124 illustratively comprises at least one outer orchestration engine that executes operations in the system control and inner orchestration layer 122 across multiple tenants via at least one access point of the access and routing layer 123. An example of the external system orchestration layer 124 is Layer 4 of FIG. 6.

The presentation layer 125 illustratively provides one or more user interfaces that are accessible to one or more of the user devices 102 over the network 104. An example of the presentation layer 125 is Layer 5 of FIG. 6.

It is to be appreciated that the particular processing platform configuration illustrated in the FIG. 1 embodiment is presented by way of example only, and that other embodiments can utilize other arrangements of additional or alternative components. For example, the particular layers 121 through 125 of the multi-layer architecture of the application manager 110 can be varied in other embodiments. Accordingly, additional or alternative layers can be used in other embodiments. Also, at least portions of the functionality of a particular one of the layers 121 through 125 can be alternatively implemented in one or more other ones of the layers 121 through 125.

Additional details regarding illustrative embodiments of an application manager suitable for use in conjunction with embodiments disclosed herein can be found in the above-cited U.S. patent application Ser. No. 15/195,159.

As mentioned previously, the virtual resources implemented by the processing platform 106 illustratively comprise containers. Such containers are more particularly assumed to comprise respective Docker containers or other types of Linux containers (LXCs) implemented using operating system level virtualization based on kernel control groups. Containers may therefore comprise respective kernel control groups of a container host device operating system. In embodiments that utilize containers, the processing platform 106 illustratively comprises a plurality of container host devices each implementing one or more of the containers. Each of the container host devices illustratively comprises at least one processor coupled to a memory. Such container host devices are also considered examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system.

The processing platform 106 illustratively incorporates one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates components for providing certain types of management and orchestration functionality. Such components may include VCE Vision™ Intelligent Operations Software, or other types of management and orchestration components, including components from Pivotal Cloud Foundry, or various combinations of multiple ones of these or other components.

In some embodiments, certain functionality of the cloud-based system is made available to a user by a cloud service provider on a Software-as-a-Service (SaaS) basis. Such users may be associated with respective ones of the user devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 15 and 16. A given such processing platform comprises at least one processing device comprising a processor coupled to a memory, and the processing device may be implemented at least in part utilizing one or more virtual machines or other virtualization infrastructure.

Additional details regarding illustrative embodiments will now be provided with reference to FIGS. 2 through 28. The embodiments to be described include examples of a multi-layer architecture and associated functionality for an application manager such as application manager 110 of the FIG. 1 embodiment. However, the multi-layer architecture as described more generally provides a reference architecture for implementation of an application management solution (AMS) in a wide variety of different types of cloud-based systems. The AMS is also referred to herein as an application management system. The reference architecture illustratively comprises Layers 1 through 5 illustrated in FIG. 6. As mentioned previously, the controlled components 120, also denoted Layer 0 in the FIG. 6 architecture, are not considered part of the reference architecture in the illustrative embodiments, but could be considered part of that architecture in other embodiments.

The application automation functionality in these embodiments illustratively involves a number of distinct actors. For example, an AMS can enable different organizational units (e.g., intra-company units or multiple company units) to collaborate seamlessly when providing information technology (IT) solutions to end users. In addition to the previously-noted tenants, other actors in a given embodiment may include a cloud service provider (CSP) responsible for cloud infrastructure, and a managed service provider (MSP) that provides application management services in accordance with service level agreements (SLAs) or other types of agreements of service contracts, such as operational level agreements (OLAs) for tenant internal MSP units. Note that an IT service company may have different organizational units for different services, for example, a unit for customer and/or system onboarding and another for steady-state support of applications.

Different units may have similar roles, as in the case of an "administrator" with different scope depending on the service contracts. If necessary, the actors can be disambiguated by specifying the organizational unit after the role in brackets, for example, as follows:

Administrator (CSP)
Administrator (MSP)
Administrator (Tenant)
IT Business Manager (CSP)
IT Business Manager (MSP)
IT Business Manager (Tenant)

It is to be appreciated that these particular actors and others referred to herein are illustrative examples only, and should not be construed as limiting in any way.

With regard to the systems under control, the AMS may be agnostic. For that reason it may be underpinned by a data and operation model that is not bound to any particular software product family.

In some embodiments, application automation is modeled as changes in parameters and states of software components. All parameters and states form a space in which the application automation and its associated orchestration operates.

This space is typically not hard-coded in the AMS, but instead is in the form of a framework for arbitrary parameter and state spaces of Systems under Control (SuCs). The concept is not limited to SuCs but rather applies to SuCs and all controllable components of such SuCs, both also referred to herein as "controllable targets." A particular parameter set and state of a controllable target is referred to as the "configuration" of a controllable target. For example, at a given point of time a database installation is configured with a set of parameters (e.g., data buffer size or enabled logging) and it is in one of the states of the underlying state model.

Figure 2:
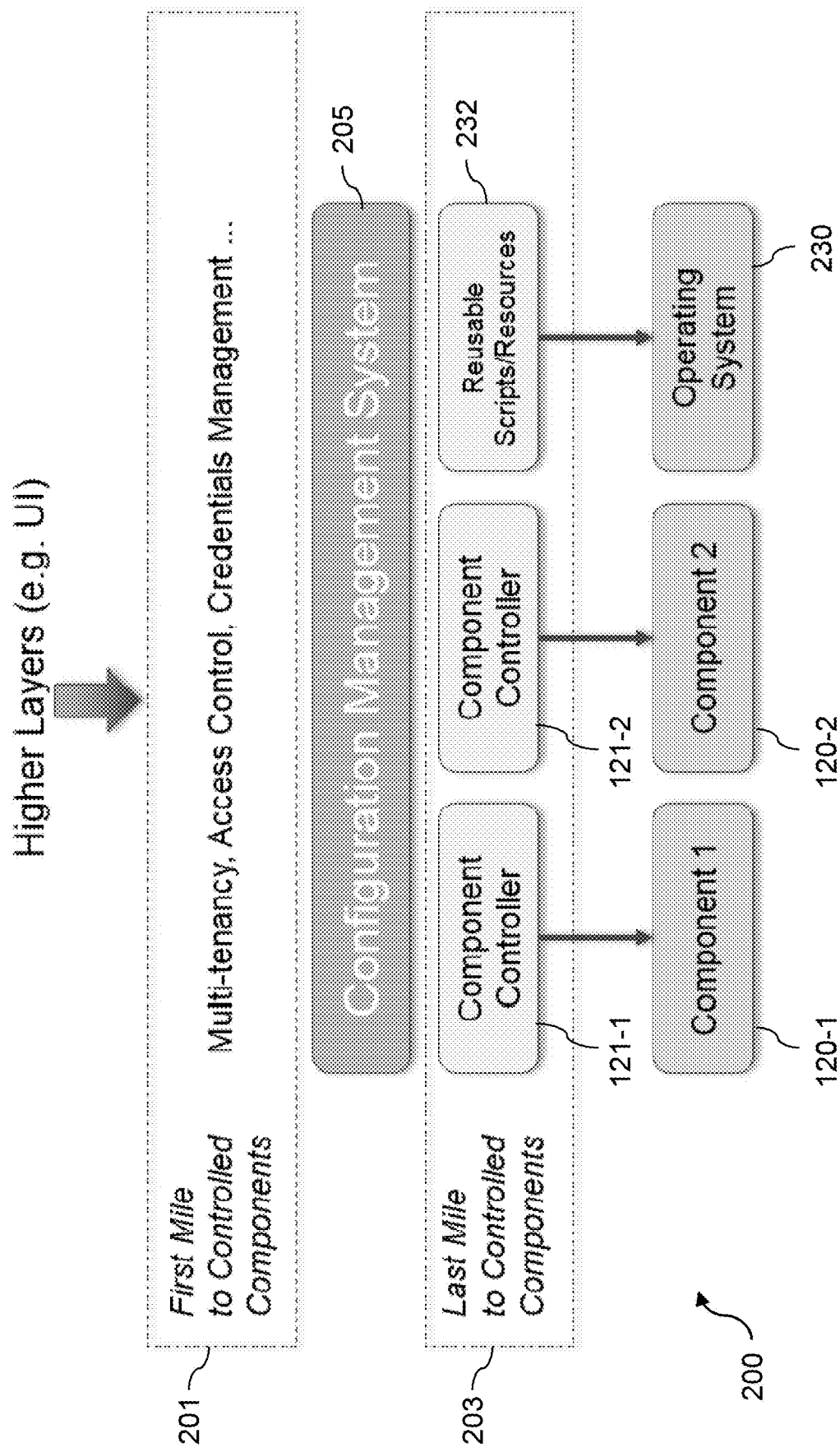
FIG. 2 illustrates an example of attaching multiple component controllers to a configuration management system in an illustrative embodiment.

FIG. 2 shows an illustrative embodiment in which an information processing system 200 is configured in accordance with a multi-layer application management architecture of the type described above in conjunction with FIG. 1. In this embodiment, the multi-layer application management architecture is separated into portions including a first portion 201 associated with a "first mile" to controlled components 120 and an additional portion 203 associated with a "last mile" to controlled components 120. The portion 203 corresponds in this embodiment to the component control layer 121 of the multi-layer application management architecture of FIG. 1. The portion 201 illustratively corresponds to one or more overlying layers associated with provision of functionality for multi-tenancy, access control and credentials management, as well as additional or alternative functionality.

The system 200 includes additional layers over the portion 201, such as one or more higher layers associated with provision of a user interface (UI) to the system 200. Such a UI layer may be viewed as an example of the presentation layer 125 in the multi-layer application management architecture of FIG. 1.

In this embodiment, an orchestration layer such as system control and inner orchestration layer 122 of FIG. 1 is assumed to be implemented at least in part utilizing a configuration management system 205 which is arranged between the first and additional portions 201 and 203. The term "orchestration layer" as used herein is intended to be broadly construed so as to encompass one or more configuration management systems such as configuration management system 205, although additional or alternative configurations of an orchestration layer may be used in other embodiments.

The system 200 of FIG. 2 is illustratively configured to support "attaching" of multiple component controllers to the configuration management system 205.

In the system 200, a plurality of applications are managed at least in part utilizing interactions between the component control layer 121 and an overlying orchestration layer of the multi-layer application management architecture, with the component control layer 121 comprising at least one component controller configured to interface with one or more of the controlled components 120.

The system 200 is configured to provide standardized microservices for controlling components of distinct applications in accordance with the multi-layer application management architecture. More particularly, in this embodiment, the component control layer 121 corresponding to portion 203 comprises at least first and second distinct component controllers 121-1 and 121-2 configured to interface with respective first and second distinct controlled components 120-1 and 120-2. The component controller 121-1 and 121-2 are implemented as respective application management microservices each presenting a standardized application programming interface (API) to the orchestration layer comprising configuration management system 205.

Although illustrated in the figure as controlling respective single components 120-1 and 120-2, also denoted as Component 1 and Component 2 in this embodiment, the component controllers 121-1 and 121-2 may each be more generally configured to control respective distinct sets of one or more components of the controlled components 120. Accordingly, the first and second component controllers 121-1 and 121-2 can be configured to control respective first and second disjoint or otherwise distinct sets of controlled components. The first and second sets of controlled components in some embodiments can comprise, for example, respective first and second distinct applications executing in system 200, or respective different portions of a given one of the applications.

Also, although multiple distinct component controllers 121-1 and 121-2 for controlling respective distinct components are shown in the figure, the component control layer 121 in other embodiments can include only a single component controller. For example, a single component controller can be configured to encompass the appropriate actions for all to-be-controlled applications, provided that performance requirements of those applications can be met using a single such component controller. Multiple instances of the single component controller can also be used. In other words, the component control layer 121 can include multiple instantiations of the same component controller.

Implementation of the component controllers 121-1 and 121-2 as respective application management microservices each presenting a standardized API to the orchestration layer facilitates reuse of component controller logic by multiple distinct configuration management systems that may be associated with the orchestration layer in some embodiments. For example, different instances of a given one of the component controllers can be utilized by respective ones of at least first and second different configuration management systems associated with the orchestration layer. At least one of the configuration management systems illustratively comprises a Salt-based configuration management system. Salt is a Python-based open-source configuration management software and remote execution engine. It utilizes an "infrastructure as code" approach to deployment and cloud management. Other examples of configuration management systems include Puppet, Chef and Ansible. These and numerous other types of configuration management systems can be similarly supported by component controllers implemented as application management microservices as disclosed herein.

One or both of the component controllers 121-1 and 121-2 are assumed to be remotely accessible from processing platforms other than the processing platform on which they are implemented. Such remote access, supporting corresponding remote control functionality for managed applications, can be provided at least in part utilizing one or more service proxies deployed in the system 200.

In some embodiments, different instances of the same controlled component for distinct applications are controlled utilizing respective corresponding instances of a given one of the component controllers 121-1 and 121-2.

The standardized API of the application management microservice implementing a given one of the component controllers 121-1 and 121-2 is configured to permit queries on state and configuration of the one or more controlled components and execution of actions against the one or more controlled components.

As a more particular example, the standardized API of the application management microservice implementing a given one of the component controllers 121-1 and 121-2 illustratively comprises multiple distinct portions, including a type API configured to return type information characterizing the one or more controlled components, a query API configured to query state information and available actions for the one or more controlled components, and an action API configured to allow actions against the one or more controlled components. Other types of standardized APIs having different arrangements of one or more portions can be used.

Each of the component controllers 121-1 and 121-2 is illustratively implemented as a stateless controller configured via its standardized API to provide the orchestration layer comprising configuration management system 205 with visibility into state information of its corresponding controlled component 120-1 or 120-2 in a standardized manner.

As noted above, the controlled components 120-1 and 120-2 in some embodiments comprise respective application controllers configured to control respective distinct applications. The component control layer in this embodiment further comprises an additional controller 232 for controlling an operating system 230 of at least one host device utilized to execute the applications. The additional controller 232 illustratively comprises reusable scripts and/or resources, and is an example of what is more generally referred to herein as an operating system controller.

The system 200 can be configured to provide effective and flexible component control for multiple distinct applications of multiple tenants in hybrid multi-tenant clouds, through the use of its component controllers implemented as respective application management microservices each presenting a standardized API to an overlying orchestration layer.

Moreover, such standardization of application management microservices for component control facilitates development of component controllers by different organizations and/or subject matter expert groups.

Accordingly, illustrative embodiments avoid the need to "reinvent the wheel" each time control code for automating application management tasks, such as monitoring or state changes, is being deployed by a different IT organization utilizing a different framework. Instead, illustrative embodiments through standardized microservices allow control code to just be "plugged into" the framework of choice.

These embodiments advantageously allow application management vendors and partners to focus on delivering standardized application component controllers as microservices for implementing the "last mile" to the controlled application components. As noted above, such component controllers comprising standardized APIs allow queries on the state and configuration of components as well as the execution of actions on these components in conjunction with application management. The component controllers in illustrative embodiments provide a particularly effective and flexible abstraction of the controlled components to higher layers of the multi-layer application management architecture, while also determining an optimal implementation as well as communication channels to the controlled components. While the factual state is always given by the state in the controlled components, the stateless controllers in illustrative embodiments are able to make these states visible for higher layers of the AMS in a standardized way. Actions offered by these stateless controllers as installed for a given tenant in some embodiments constitute a structurally homogeneous AMS action library in combination with an always up-to-date single source of truth for the factual configuration and states of the managed application components.

The resulting AMS architecture provides a high level of modularity and adheres to a microservices paradigm. It provides substantial improvements in numerous important aspects of application management, such as segregation of concerns, robustness, testability, reusability, extensibility, portability, supportability and ease of configuration.

Furthermore, the standardization of microservices for controlling application components as disclosed herein can provide a particularly efficient division of labor between those organizations that focus on the controllers and those who focus on the orchestration of complex system landscapes.

The controlled components 120 described in conjunction with the embodiments of FIGS. 1 and 2 are also referred to herein as controllable targets or simply targets. Additional details of such components will now be described.

Figure 3:
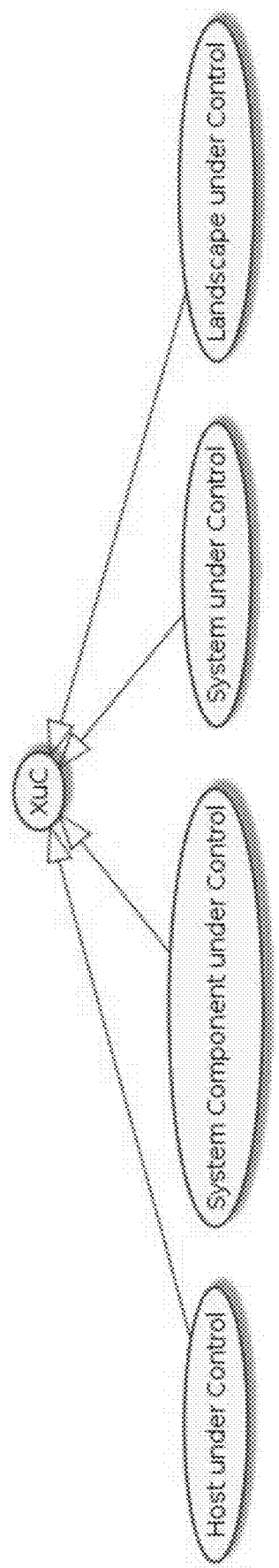
FIG. 3 shows examples of different types of things under control.

FIG. 3 illustrates examples of different types of controllable targets. Controllable targets are not limited to SuCs. More generally, controllable targets can comprise a host, a system component, or a group of systems. The latter is also referred to herein as a "landscape." These and other example controllable targets are also referred to herein as "Things under Control" (XuCs). XuCs are controlled by software components that are referred to herein as "controllers." Such controllers communicate with the XuC via an endpoint that the XuC exposes (e.g., ssh on a UNIX host).

Figure 4:
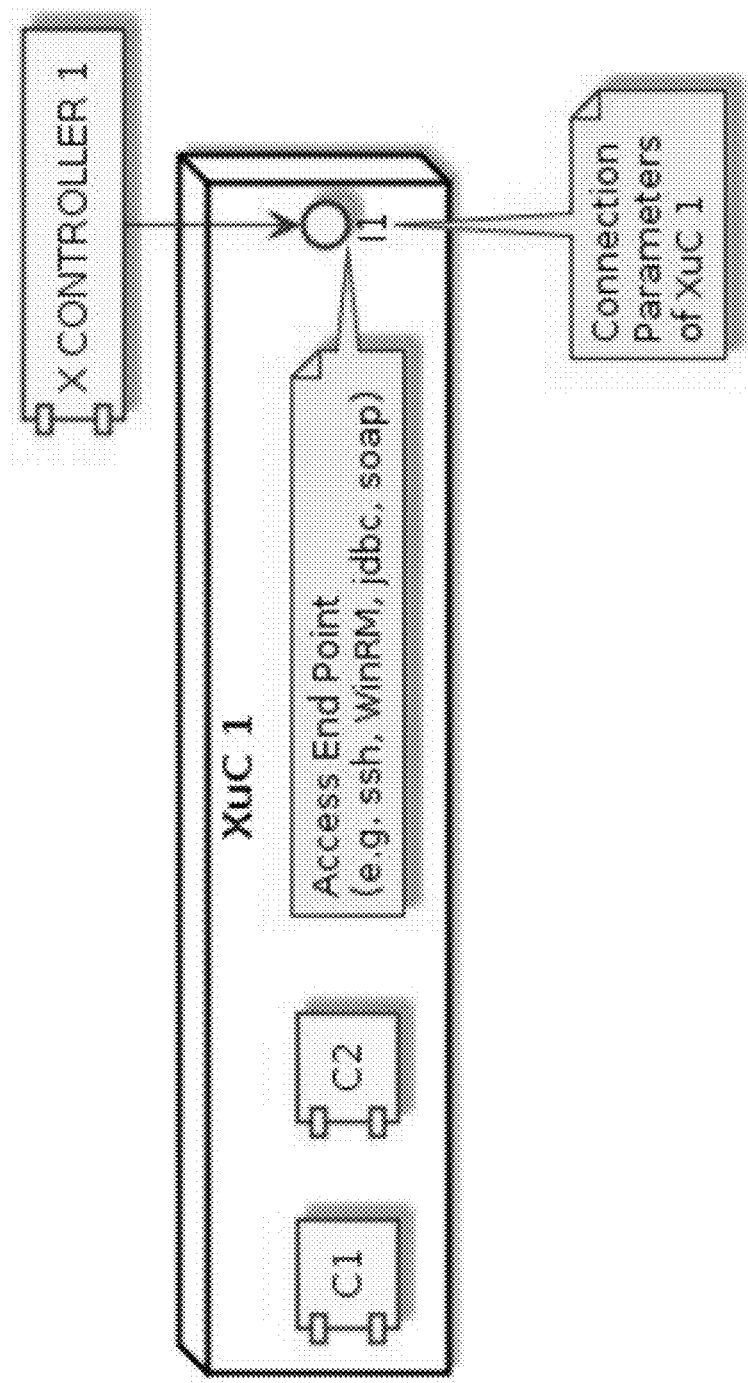
FIG. 4 shows an example of a component controller and a controlled component.

FIG. 4 shows an example of a component controller and a controlled component. The controlled component is denoted XuC 1. In this example, XuC 1 contains elements C1 and C2 that are subject to control. These are not directly accessible, they can only be read and changed via access to the XuC. Such elements are also referred to herein as "controllables" or "indirectly controllable components." Depending on the architecture of the XuC, certain operations may be possible only on such indirectly controllable components.

Operations that query or change the configuration of a target are referred to herein as "atomic operations" (or just "operations") when executed via a controller request. It does not matter how complex the underlying technical process is for one operation (e.g., SAP instance start on a host). The operation is atomic from the point of view of the controller. The execution of the task is either successful or not.

The set of all available atomic operations provided by all controllers that are installed in a particular AMS is referred to as the "inventory of atomic operations." Such operations can be categorized, for example, along stack dimensions (e.g., infrastructure, OS, application) and/or along application management disciplines of monitoring, deployment, configuration and export/import.

The semantics of atomic operations are usually bound to the semantics of the respective controllable targets. There are typical patterns or types of operations that occur repeatedly (e.g., create, copy, delete, start, stop) and instances of such patterns or types of operations often exhibit very similar semantics.

Startup and shutdown operations are generally considered atomic. Whether a controller offers an atomic reboot, however, may depend on the XuC. If not, then the AMS may need to implement a reboot using multiple atomic operations (e.g., shutdown, check state, startup, etc.).

The set of all XuCs that are under control of a given AMS component is referred to as the AMD of that component.

As XuCs can be recursively nested, the resulting systems can be arbitrarily complex.

Figure 5:
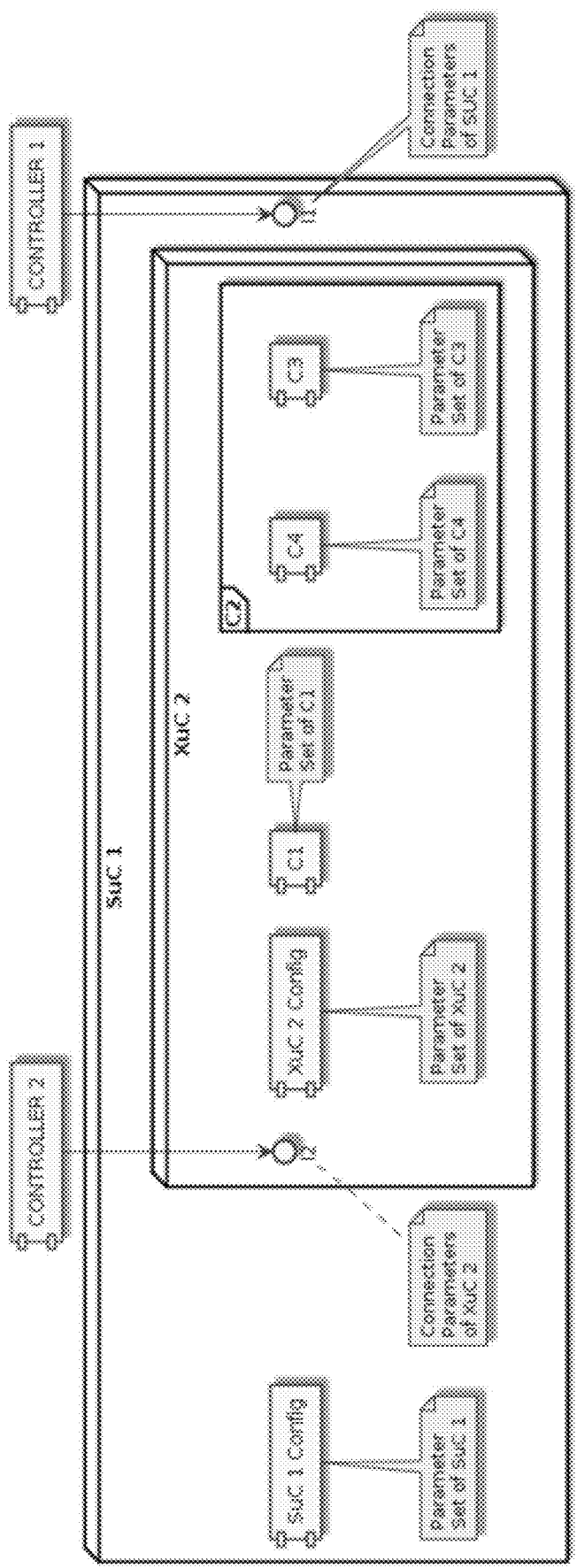
FIG. 5 illustrates controllable targets and configurations in a complex system under control.

FIG. 5 illustrates controllable targets and configurations in a complex system under control or SuC. In this example, an SuC denoted SuC 1 has a child XuC denoted XuC 2. SuC 1 is controlled by a first controller denoted Controller 1 and the embedded XuC is controlled by another controller denoted Controller 2. SuC 1 contains XuC 2. In this example, SuC 1 does not have any other controllables, but XuC 2 has controllables C1, C2, C3 and C4. The controllables C3 and C4 are contained in C2. All targets have parameter sets. In addition, XuC 2 includes connection parameter sets that comprise all required information so that the controllers are able to connect to them.

The set of configurations of an XuC and all contained controllable targets (recursively) combined with the description of the topology of the XuC are referred to herein as the "blueprint" of the XuC. As noted above, configuration of a target subsumes parameter settings as well as the state of the target. The actual or current blueprint of an XuC is referred to as the "factual blueprint" of the XuC. Similarly, the set of blueprints of all XuCs of an AMD is referred to as the "factual blueprint" of the AMD.

The to-be blueprint for an XuC deployment is referred to as the "deployment blueprint." If the factual blueprint of an XuC is used to register an already existing XuC into the AMS then it is referred to as a "registration blueprint." Deployment and registration blueprints are subsumed under "execution blueprints."

Execution blueprints specify all parameters and states required for the execution of the corresponding deployment and/or registration. They may be derived from under-parameterized or otherwise under-specified blueprints that act as templates for the construction of execution blueprints. These under-specified blueprints are called "proto blueprints."

Blueprints complement the use cases in which atomic operations are explicitly executed with use cases that follow a more declarative approach. Upon execution, the AMS converges the XuCs into a configuration that corresponds to the desired state expressed in an execution blueprint provided by the AMS user. In other words, the factual blueprint of an XuC equals the execution blueprint after successful execution.

Deployment blueprints can be used to build up a system or system landscape. For example, a system component can be added to an SuC using an "add child" operation via a deployment blueprint. As another example, a new landscape can be added to an existing landscape using a deployment blueprint.

The multi-layer architecture mentioned previously will now be described in greater detail with reference to FIG. 6. It is assumed that this multi-layer architecture includes five layers denoted Layer 1 through Layer 5. These layers correspond to respective ones of the layers 121, 122, 123, 124 and 125 of the multi-layer architecture of application manager 110 in the FIG. 1 embodiment. There is an additional underlying layer denoted Layer 0 that includes controlled components and material. Such a layer corresponds to the controlled components 120 in the FIG. 1 embodiment. As mentioned previously, in other embodiments, a layer such as Layer 0 can be considered part of the multi-layer architecture.

The multi-layer architecture in illustrative embodiments serves as a reference architecture for an AMS. It is assumed that each of the layers is implemented using redundant servers or other types of redundancy in order to ensure high availability. For example, all controllers of Layer 1 may be implemented on redundant servers for high availability. The other layers may be similarly configured to support high availability.

Layer 0 comprises the controlled components that belong to the managed applications and underlying infrastructure as well as all required material for provisioning of applications. This material may include, for example, software installation media and VM templates.

Layer 1 is the component control layer and comprises infrastructure, OS and application component controllers. For example, different clouds may require different controllers, such as different cloud management platforms (CMPs). Also, different operating systems may require specialized OS controllers and different application components may require specialized application controllers. All controllers in this embodiment are assumed to allow the execution of actions on the controlled component via Representational State Transfer (REST) API, ideally using standardized APIs. This layer provides the first extension point of the AMS by allowing software providers to build controllers that can be plugged into the AMS.

Additionally, Layer 1 is configured to allow the execution of actions on or to query data from existing system components. It is not intended to deploy and/or remove systems or system components or to cater to the complex inherent logic of application systems. The components therein instead adhere to a "fire and forget" strategy. Note that the OS controller is an extension point where server management solutions such as Chef, Salt or Puppet may be hooked in.

Layer 1 as shown in the figure includes different instances of a CMP interface (CMP IF), operating system controllers (OS Control 1 and OS Control 2), and application controllers (App Control 1, App Control 2 and App Control 3) for each of multiple tenants, including Tenant 1 of Site A, Tenant 2 of Site A and Tenant 2 of Site B. Numerous other arrangements of CMP interfaces, operating system controllers, application controllers, tenants and sites can be used in other embodiments.

The controllers of Layer 1 are assumed to be stateless. Such controllers are illustratively configured to perform translation from "native" XuC management functions into a standardized API that can easily be consumed by Layer 2.

If the AMS uses a configuration management system then all stateful components (e.g., agents) of the configuration management system are considered Layer 2 components. In this case there may not be any stateless OS controller.

Layer 2 is the system control and inner orchestration layer. It is configured to provide services with which operations can be performed on application system level. These services consider the complex nature of a given SuC by properly modeling its state and parameters as well as the states, parameters and dependencies of the components that belong to the SuC. It is also responsible for the provisioning and disposal of systems or system components. If required for core functions such as deploy, launch or shutdown, including functions collectively referred to elsewhere herein as startup, shutdown and reboot ("SSR"), this layer will orchestrate multiple operations within one Layer 1 controller or across multiple Layer 1 controllers. This type of orchestration, referred to herein as "inner orchestration," is usually not explicitly modelled by an automation engineer but instead implicitly encoded in the system model. Layer 2 in the multi-layer application management architecture of FIG. 6 is an example of what is more generally referred to herein as an "orchestration layer."

The AMS component that provides the services for Layer 2 is referred to herein as an "inner orchestration engine." The set of all XuCs controlled by that engine is its AMD. In this embodiment, Layer 2 is shown as including multiple orchestration engine instances for respective tenants, including Orchestration Engine Instance 1 for Tenant 1 of Site A, Orchestration Engine Instance 2 for Tenant 2 of Site A, and Orchestration Engine Instance 3 for Tenant 2 of Site B. Numerous other arrangements of orchestration engines, tenants and sites can be used in other embodiments. Examples of orchestration engines that are implemented in Layer 2 in some embodiments include Apache Brooklyn and SaltStack Master.

Layer 2 is also the layer in which autonomous application management is implemented. For example, it can provide secure storage of any XuC credentials required to execute operations on the controlled components. The need for securely storing and providing XuC credentials arises in many automation contexts. For example, credentials are typically required in the context of a Puppet manifest.

Layer 2 provides a second extension point in at least two ways. First, the AMS can provide a mechanism to load or install system models supplied by software providers into the corresponding component of the AMS. Second, automation engineers as well as other suppliers can construct and deliver ready-made proto blueprints for software solutions compatible with available system models.

Layer 3 is the access and routing layer. It provides a highly available API access point to the AMS. The API implements a generic, application-agnostic set of functions to execute and schedule operations on Layer 2. It routes requests to the appropriate Layer 2 component of the AMS or to 3rd party cloud management systems that are integrated into the AMS. This support for integration with 3rd party systems can be viewed as providing a third distinct extension point of the AMS.

In addition, Layer 3 implements the multi-tenancy and multi-site requirements of the AMS, including any hybridity requirements. It is also responsible for authentication, authorization and logging of operations. It is assumed that this layer is under governance of the CSP that hosts the AMS.

Layer 4 is the external system orchestration layer. It comprises all components that execute Layer 2 operations through the Layer 3 API in order to perform system management functions such as monitoring or backup. These can be external monitor systems or systems that perform orchestration of multiple operations explicitly modeled by an automation engineer or provided as an additional package by a software provider or other company. For example, this layer may provide an interface to external management systems governed by customers (e.g., tenants). Additionally or alternatively, it can include a credentials manager that controls the credentials management component inside Layer 2.

The control systems on Layer 4 are also referred to herein as "outer control systems" as they are outside the API boundaries of Layer 3 and hence need to authenticate against the API. These control systems can include, for example, workflow systems (e.g., BPMN compatible) or scripting extensions (e.g., plugin into Eclipse for Groovy scripts) that allow automation engineers and others to design, test and run scripts that encode the logic of orchestrated operations. As these systems live outside the tenant and site boundaries they can orchestrate operations on systems across tenants. For example, an MSP administrator may want to apply patches to all SAP systems of all tenants for whom the MSP provides SAP system management services. Or a particular orchestration for one tenant may have to span multiple sites for a hybrid application management scenario.

Layer 4 provides a fourth extension point of the AMS as suppliers can construct and provide automation packages that are compatible with one of the outer control systems of the AMS. Additionally or alternatively, software providers may develop and distribute additional outer control systems that interface with the Layer 3 API.

Layer 5 is the presentation layer of the AMS. It provides a user interface that is directly and easily accessible via the Internet and which works equally well on PC, tablet and even smart phone, depending on the exposed function. For example, some of the actors may need to access the AMS while traveling or during customer meetings, especially users with account manager or IT business roles. This layer constitutes the fifth and final extension point of the AMS as it allows software providers to develop an alternative user interface that interfaces with the outer control systems and the Layer 3 API.

Additional characteristics and other functional features of Layers 1 through 5 in illustrative embodiments will now be described. It is to be appreciated that the particular listings of features provided below and elsewhere herein are not requirements, but are instead possible features of illustrative embodiments. A given embodiment can include only subsets of the listed features, and may include additional or alternative features not explicitly listed.

In the following description, listed features are numbered using the format x.y, where x denotes the layer number, and y denotes the feature number.

The following are examples of functional features of a given controller of Layer 1:

1.1: The controller provides a REST API that allows execution of atomic operations against XuCs. The number and scope of these operations will depend on the particular implementation of the controller.

1.1b: The controller API to execute operations follows a standard to be established by the implementer of the AMS framework.

1.2: The controller provides SDKs (e.g., libraries) for Java and C# for easy integration with Layer 2 engines.

1.3: The controller is stateless.

1.4: The controller can perform the operations on the XuC without the need of having AMS-specific agent software installed on the XuC. Note that agents that belong to the XuC itself do not count as AMS-specific agents. The SAP Control Host Agent that belongs to the SAP NetWeaver stack is such an example.

1.5: The controller does not store credentials for the XuC interface (e.g., interface I0 or interface I1 in FIG. 10).

1.6: The controller can write information into a central logging system for the purpose of root cause analysis of AMS malfunctions.

The following are examples of functional features of a given inner orchestration engine of Layer 2:

2.1: The inner orchestration engine exposes the atomic operations of all controllers that are relevant for the management of the SuC.

2.2: The inner orchestration engine reflects the topology and configuration (e.g., states and/or parameters) of the SuC and the respective configurations of its components.

2.3: The inner orchestration engine caters to the system-inherent dependencies of components when it provides system operations as services via its API. Examples include launch and shutdown operations that should respectively start and stop the system components in the correct order.

2.4: The inner orchestration engine provides services for the deployment of systems and system components via deployment blueprints following standards such as TOSCA and/or OASIS CAMP.

2.5: The inner orchestration engine provides services for the disposal of systems and system components.

2.6: The inner orchestration engine provides services for the registration of existing systems (not deployed by the inner orchestration engine) that are controllable and/or compatible with an installed system model.

2.7: The inner orchestration engine provides services for querying the availability, performance and health of the SuCs and system components.

2.7b: The inner orchestration engine can configure performance and health monitoring components (e.g., thresholds for critical states and/or alerts).

2.8: The inner orchestration engine provides autonomous execution of operations based on configurable rules and/or policies.

2.9: The inner orchestration engine can automatically discover relevant controllables inside the SuC.

2.10: The inner orchestration engine provides interfaces to credentials providers that securely store and present the credentials required for the execution of operations on Layer 0 components.

2.11: The inner orchestration engine provides non-disruptive upgrade of the inner orchestration engine components including the installed system models.

2.12: The inner orchestration engine is configured for high availability.

2.13: The inner orchestration engine can write information into a central logging system for the purpose of root cause analysis of AMS malfunctions.

Whereas components on Layers 0 to 2 belong to one tenant and may be distributed over multiple AMDs, the AMS components on Layer 3 provide one central access point to the AMS that allows execution of system management operations on all AMDs that are part of the AMS installation. This layer allows operations to be executed immediately or scheduled. It makes sure that the request is routed into the appropriate AMD.

The following are examples of functional features of components of Layer 3:

3.1: The access point provides a highly available and scalable REST API through which the user can execute or schedule system management operations against the Layer 2 inner orchestration engine of a connected AMD.

3.1b: The API allows for one time as well as recurrent executions of system management operations.

3.1c: The API logs all executions of system management operations with time and requesting user.

3.2: The access point authenticates the requesting user against an identity management system such as Active Directory or LDAP to which the access point is connected.

3.3: The access point tests whether the authenticated user is authorized to execute and/or schedule the request and declines the request if the authorization is insufficient.

3.4: The request router ensures that requests are routed to the correct Layer 2 inner orchestration engine depending on the targeted AMD specified in the request.

3.5: The AMS securely transports requests into the target AMD even if there is no network connectivity between Layer 3 and Layer 2.

3.6: The access point and/or request router support different Layer 2 inner orchestration engines by implementing a flexible plug-in architecture that specifies how operations can be executed and which authorizations need to be tested for which type of operations.

3.7: The access point and/or request router support the integration with 3rd party system management tools (e.g., in Layer 2, 1, 0) so that it can proxy requests to those tools.

3.8: The AMS contains a Java and/or C# SDK/library for integrating the access point services into Java and/or C# programs.

3.9: The access point and request router write information into a central logging system for the purpose of root cause analysis of AMS malfunctions.

Layer 4 provides additional orchestration capabilities that allow the explicit orchestration of multiple Layer 2 operations via one or multiple orchestration engines. As these components are outside the main Layer 3 access point of the AMS, they are referred to as "outer orchestration engines." Being external allows them to orchestrate operations across multiple tenants and AMDs and to integrate additional AMS-external systems. This provides a high degree of flexibility to MSPs which need to manage systems of many tenants and it constitutes an additional extension point as different 3rd party workflow systems can be leveraged to operate on Layer 4. For example, BPMN workflow engines are designed to model the collaboration between human and system actors.

Layer 4 components do not necessarily have to be workflow engines. The more general term "L4 scripts" is used to denote artifacts that encode the execution logic of the orchestrations. Other more general terms that can be used to describe such components include "recipes," "workflows" or "scripts."

The following are examples of functional features of a given outer orchestration engine of Layer 4:

4.1: The outer orchestration engine can orchestrate Layer 2 system operations by running those operations in sequence, in parallel, with conditions ("gateways"), loops and similar workflow-like control logic ("L4 scripts").

4.2: The outer orchestration engine provides a REST API that allows the execution or scheduling of L4 scripts.

4.3: The outer orchestration engine can propagate the user's credentials to Layer 3.

4.4: The outer orchestration engine can write information into a central logging system for the purpose of root cause analysis of AMS malfunctions.

In some embodiments, the outer orchestration engine may be replaced with an embedded orchestration engine that spans Layer 3 and Layer 4. The AMS in such an embodiment tightly integrates a Layer 4 outer orchestration engine behind the Layer 3 access point.

The user interface (UI) of the AMS is configured to expose all management functions of the AMS in the most usable way. It presents a single point of entry for all AMS actors ("single pane of glass").

The UI may be configured to support, for example, a service catalog for blueprint deployment, authoring of proto Blueprints and L4 scripts, execution of L4 scripts as well as L3 system operations, and graphical representation of the SuC topologies.

The following are examples of additional functional features of a given UI of Layer 5:

5.1: The UI is securely accessible via HTTPS.

5.2: The UI can propagate or map user credentials to the Layer 3 and/or Layer 4 access points.

5.3: The UI supports all standard web browsers (e.g., Google Chrome, Microsoft Internet Explorer, Firefox, Apple Safari).

5.4: The UI is suitable for use on a PC as well as mobile devices (e.g., tablets, smart phones).

5.5: The UI is directly accessible via Internet (e.g., no VPN required).

5.6: The UI is securely connected to Layer 4 and Layer 3.

5.7: The UI provides a user role concept so that it will only present to a logged-in user those XuCs, L4 scripts and L3 operations for which the user is assigned the appropriate role.

The above-described features associated with the various layers of the multi-layer application management architecture of FIG. 6 are presented by way of illustrative example only and should not be viewed as limiting in any way.

Some illustrative embodiments disclosed herein are configured to provide configurable startup, shutdown, reboot and isolation procedures implemented using application manager 110 comprising the multi-layer application management architecture of FIG. 6. Such procedures are well-suited for use with hybrid multi-tenant clouds and numerous other types of cloud-based information processing systems. The startup, shutdown and reboot procedures are collectively referred to as SSR procedures. Similarly, startup, shutdown, reboot and isolation procedures are collectively referred to as SSRI procedures.

It should be understood that references herein to SSR can be extended in a straightforward manner to SSRI. Also, SSR should be viewed as generally referring to startup, shutdown and/or reboot, and SSRI should be viewed as generally referring to startup, shutdown, reboot and/or isolation.

The AMS in illustrative embodiments is configured to perform SSR procedures for arbitrarily complex applications that can be described by blueprints and have well defined interfaces for startup and shutdown of their single components. The AMS can provide additional functionality to isolate systems for maintenance to protect them from interfering processes stemming from online users, external systems or internal background jobs.

In some embodiments, the AMS is configured to allows an operator to just "push a button" to start up, shut down, reboot or isolate a complex system or even larger groups of systems ("landscapes") relying on appropriate defaults that control the sequences of the SSRI operations along with all required parameters. These defaults can be made configurable in the blueprints of the systems under control. The AMS is also illustratively configured to allow the operator to overwrite these defaults wherever applicable, for example to limit the set of to-be-started systems or system components.

As described in the above-cited U.S. patent application Ser. No. 15/669,608, the AMS in some embodiments provides configurable SSRI functionality utilizing recursive run layers, shutdown modes, isolation levels, pre-SSR and post-SSR actions and a comprehensive SSRI command language that builds on these techniques and includes further options for timeouts, retries and other features. Such embodiments provide a highly customizable AMS for startup, shutdown, reboot and isolation of the components of complex enterprise systems and system landscapes. Other embodiments disclosed herein need not provide configurable SSR and/or SRRI functionality.

Additional characteristics and other functional features of Layer 1 and Layer 2 in illustrative embodiments will now be described. The following description will more particularly describe the manner in which component controllers are implemented using standardized microservices in illustrative embodiments.

As mentioned above, some embodiments are configured to provide component controllers implemented as respective application management microservices in a component control layer such as Layer 1 that is arranged between an orchestration layer such as Layer 2 and the applications or other components under control in Layer 0. Such arrangements provide considerable advantages, illustratively including the following:

1. Action abstraction via what are referred to herein as "generalized action semantics." For example, the actions added to the library may abstract implementational differences when it comes to different platforms on which the controlled component is running. This way the orchestration engine can fully concentrate on the orchestration of actions across application systems and groups of systems.

2. Reusability of control logic implementation.

3. Feed into a unified action catalog that higher AMS layers can leverage to discover and expose available actions and their parameters, also referred to herein as "action discovery."

4. Component controllers are stateless and leave state to higher AMS layers, therefore they are easier to implement and manage.

5. Component controllers implement idempotent operations. Higher AMS layers can then fully rely on that pattern for enhanced automation robustness.

6. Improved testability and improved opportunities for test automation leveraging the standardization of actions.

7. Handle specific 3rd party libraries that are required to interface with the application under control.

8. Extensibility via microservices, in that software vendors can develop component controllers for the AMS that can be easily plugged into and leveraged by higher AMS layers. The vendors can use the programming language of their choice and are not bound to the language of the AMS framework.

9. Better portability of orchestration engines from one framework to another as they do not contain code to interface with the systems under control.

10. Learnability, supportability and understandability: automation engineers and support staff will find it easier to learn and handle component controllers that follow a standard.

11. By requiring full auto-discovery of components that are in the control scope of the controller there is very little or no configuration required for the controller itself.

12. Standardize error log messages for the actions.

The particular advantages outlined above are associated with illustrative embodiments, and need not be present in other embodiments.

As noted above, illustrative embodiments provide reusability and portability. For example, an AMS configured to automate tasks for a very diverse set of applications will typically include a considerable body of code. This code, for example, will cater to execution of actions on systems under control, routing of actions to the controlled systems, ensuring security aspects, orchestration of actions across systems, etc. Naturally, the code will grow as more applications are included into the AMS scope, mainly because different applications (e.g., enterprise applications) come with their own idiosyncratic set of management tools, management APIs and procedures the AMS will have to handle.

Further, AMS implementations in some embodiments are configured to leverage configuration management systems such as Puppet, SaltStack, Chef or Ansible as customers already may be users of these frameworks and as their usage may alleviate the burden of implementing robust communication channels between orchestration and components under control. The implementation may also strive to reuse the many available modules (e.g., for OS control) shipped with these frameworks. An AMS implementation in some embodiments is able to integrate any configuration management system to give the customer the option to keep the framework they already have invested in. Such an implementation comprises reusable modules with appropriate abstraction. These reusable modules can be in the form of programs, scripts or resources that are kept while the configuration management system is replaced. Even if an operation-system-near script written in a first configuration management system cannot easily be transformed or reused in a second configuration management system, then in many cases at least the underlying resources can be reused for both. Examples include installation response files that are used to feed into the automated installation of application systems. Other examples include reusable PowerShell Desired State Configurations (e.g., SALTStack, Puppet and Chef provide modules for DSC integration).

The AMS implementation in some embodiments is configured to maximize the code reuse while still being able to leverage desirable capabilities of the employed configuration management system. Maximizing code reuse means that those modules which interface with the controlled components should include as much of the control logic as possible. This is referred to above in the context of FIG. 2 as the "last mile" to the controlled components, corresponding to the code in portion 203 of system 200. Similarly, the AMS is illustratively configured to reuse the code that interfaces with the configuration management system top down, referred to above as the "first mile" to the controlled components. This is the code in portion 201 that implements multi-tenancy, access control, credentials management and the like, as illustrated in FIG. 2. Such embodiments advantageously provide a highly maintainable, modular and extensible code and architecture with appropriate abstraction layers.

With regard to the systems under control, the AMS is agnostic. For example, it is underpinned by an abstract data and operation model that is not bound to any anticipated software product family.

A major part of automation is modeled as the change of parameters and states of software components. All parameters and states form a space in which the automation/orchestration operates.

Controllable targets do not have to be full application systems (e.g., SuCs). In general they could be any software component or even groups of systems (e.g., "landscapes") or just hosts (also referred to as "servers" or "nodes"). As mentioned previously, such targets are also referred to herein as "Things under Control" or XuCs, and are controlled by software components more generally referred to herein as "component controllers." XuCs may contain elements that are in the scope of the controller (e.g., C1 and C2 in FIG. 4). These are only indirectly accessible, i.e., they can only be read and changed via access to the XuC. Such elements are referred to herein as "indirectly controllable components." Depending on the architecture of the XuC, SSR operations may be possible only on such indirectly controllable components. This is the case, for example, when an instance SAP NetWeaver system is controlled via the SAP Control Web Service of the system.

Atomicity is important for robust large-scale orchestration. All operations that query or change the configuration of a target are referred to herein as "atomic operations" (or just "operations") when executed via one controller request. It does not matter how complex the underlying technical process is for one operation (e.g., SAP instance start on a host). The operation is atomic from the point of view of the controller. The execution of the task is either successful or not and will transfer the controlled component from one consistent state into the other. If the controller cannot cater to the atomicity of the operation then the operation can be broken up into smaller operations.

If an atomic operation adheres to the structure and semantics of the generalized action semantics described below, it is referred to herein as an "action." For example, actions illustratively comprise idempotent atomic operations with well-defined and published pre- and post-conditions. The library of all actions installed and consumable in an AMS is called the action library. Not every atomic operation is an action. For example, the operations defined by libraries such as jclouds may well be leveraged in higher AMS layers but they do not follow the action semantics described herein.

Components can be part of different SuCs at the same time which imposes additional challenges for the orchestration. The orchestration layer needs to be aware of these relationships and dependencies.

Generalized action semantics in illustrative embodiments will now be described with reference to FIGS. 7 and 8. The inherent characteristics of automation actions are foundational for the Layer 1 API. In general, an action can be characterized as a transformation of a world context c (e.g., describing entity states and content) to another context c':

$$c'=\text{action}(c)$$

If both contexts differ in a manner caused by the action then the action is a changing action, otherwise the action is a non-changing action.

Actions have definition characteristics and execution characteristics. The first are determined during design time, the second are an inherent part of each execution of an action (such as the world context).

Figure 7:
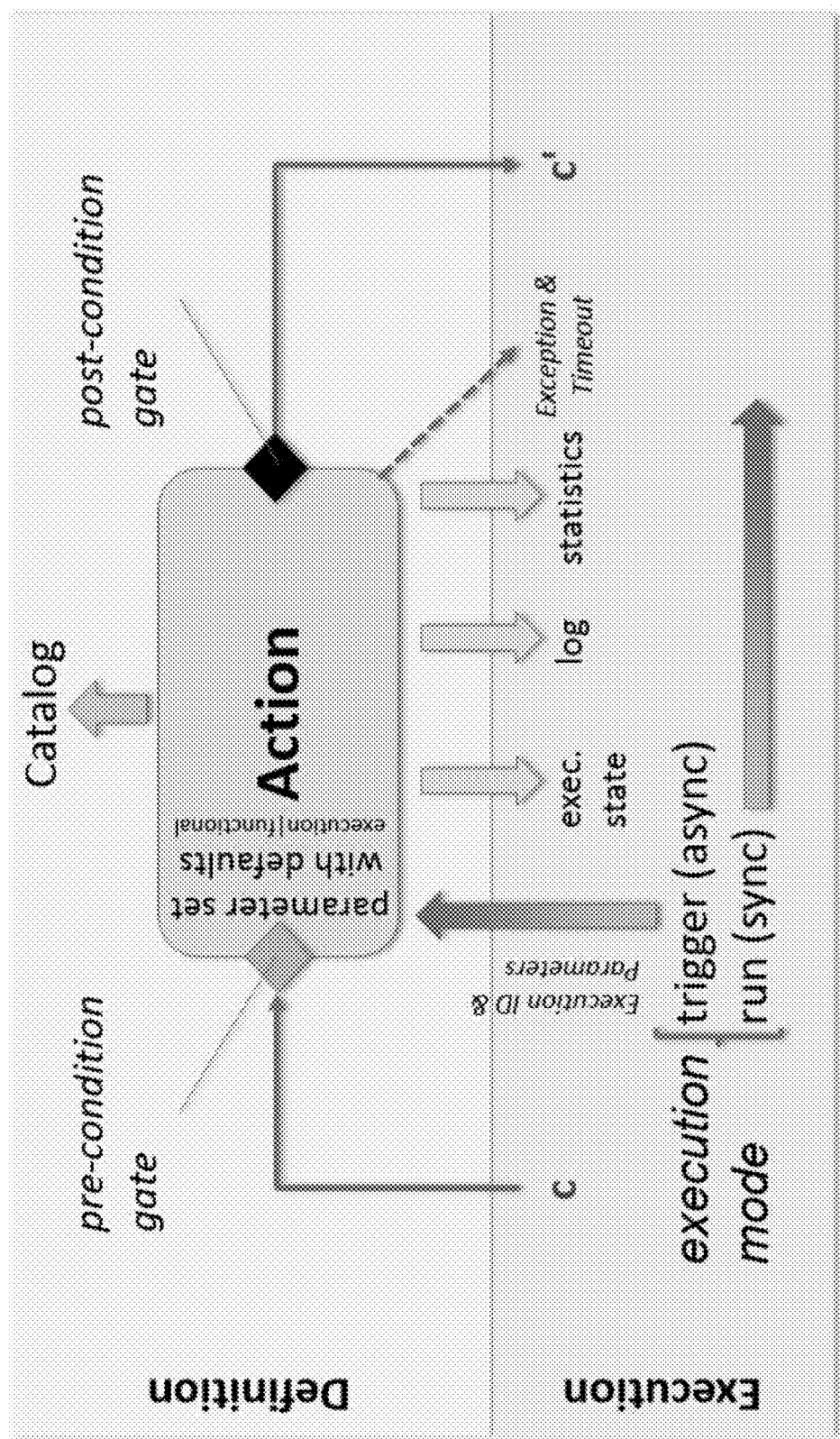
FIG. 7 shows examples of generalized action semantics in an illustrative embodiment.

Referring now to FIG. 7, examples of definition and execution characteristics of actions are shown in more detail.

The definition characteristics illustrated in FIG. 7 include:

1. Pre-condition Gate. An optional set of tests that are performed against c that must be fulfilled before the action is executed (otherwise the controller returns the call with an appropriate response).

2. Post-condition Gate. An optional set of tests that are performed against c' that must be fulfilled for the action to exit successfully (otherwise it exits with an exception).

3. Functional Parameters (with defaults). These parameters illustratively populate a catalog with action metadata.

4. Execution Parameter Defaults. These include timeouts.

5. Idempotency. Every action is assumed to be idempotent with respect to the XuC's modeled state, meaning that action(action(c))=action(c).

The execution characteristics illustrated in FIG. 7 include:

1. Execution Mode. The execution modes include a "trigger" mode in which the controller returns prior to reaching the end state (also called "asynchronous mode"), and a "run" mode in which the controller waits until the action is completed and the post-condition is met or a timeout is reached.

2. Execution Parameters (with defaults). These include connection data (relevant to control scope and auto-discovery), credentials for XuC, log level, execution timeout, and cache validity (e.g., bypass, refresh).

3. Execution ID. A unique identifier for each execution (important for logging, tracing, etc.).

4. State of Action Execution. The states include not started, in progress, completed, and failed. Note that the same action for the same XuC can only be executed once at the same time; due to the stateless nature of the component controller it is not possible to ask the controller the state of a past action; execution state management is done by a higher layer if that is a requirement of the AMS.

5. Log Information. Includes verbosity depending on log level.

6. Execution Statistics. Includes run time of the execution. Due to statelessness of the controller this information is embedded in the payload of the API response. Failure/completion statistics (for extrapolation) are implemented in higher AMS layers if required.

In the above listings of definition and execution characteristics, both functional parameters and execution parameters are illustratively underpinned by a flexible default parameter approach using the following cascade where ">" means "overwrite": User Input>XuC specific defaults (as per blueprint)>defaults configured by the MSP>built-in defaults.

These are only examples, and other types of definition and execution characteristics and associated default arrangements may be used in other embodiments.

Figure 8:
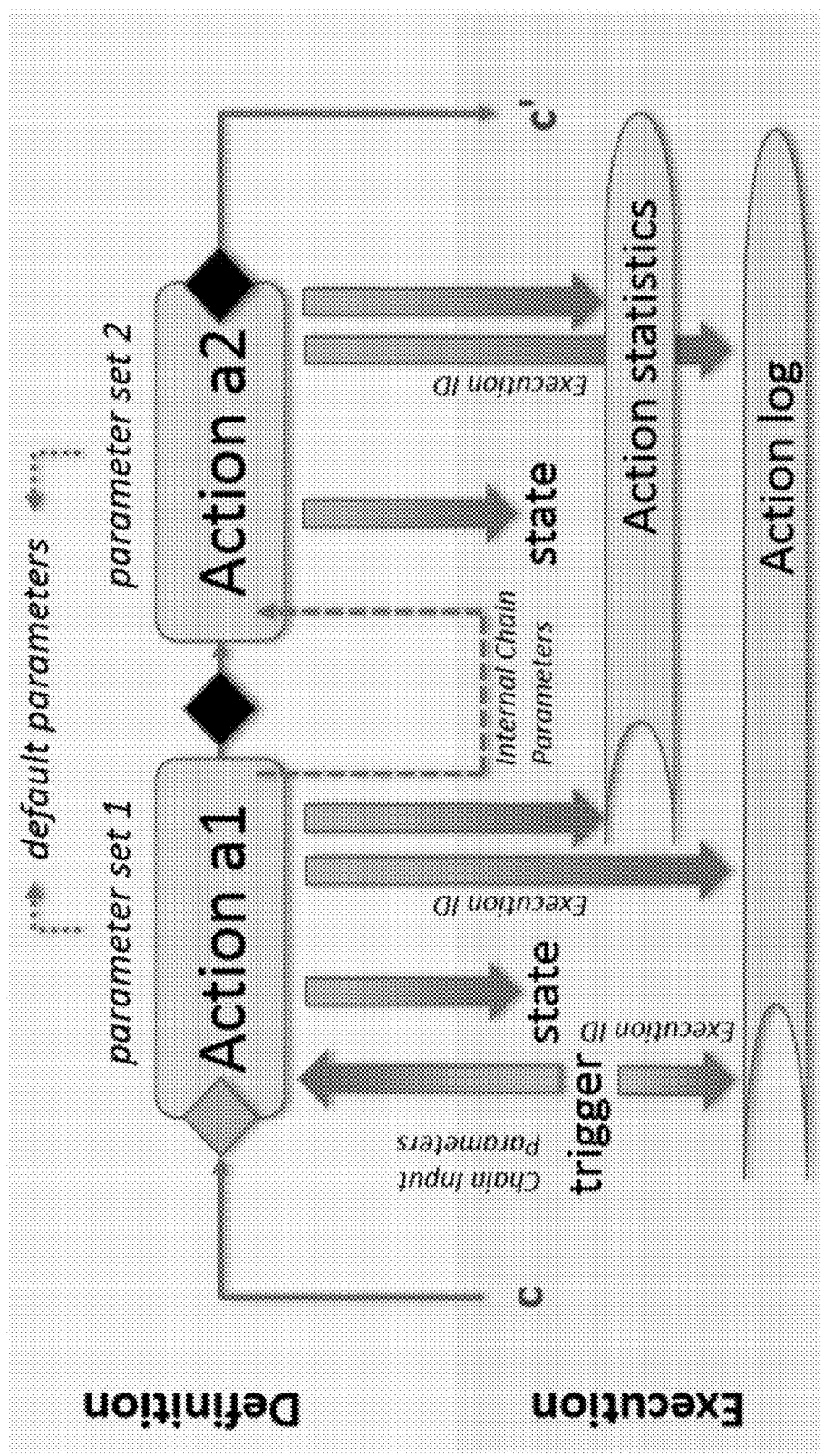
FIG. 8 shows examples of action chains in an illustrative embodiment.

FIG. 8 illustrates an action chaining arrangement in an illustrative embodiment. Consecutive actions are referred to herein as "action chains." As with actions, an action chain has definition as well as execution characteristics. Component controllers in some embodiments do not chain actions, but instead leave that to higher AMS layers.

As illustrated in FIG. 8, an example action chain comprises a chain of two actions a1 and a2. The trigger of the first action (a1) is the trigger of the chain. The parameter sets of both actions merge into one parameter set (with defaults) of the chain. It is important to note that the merged parameter set is not necessarily identical with the input parameter set of the chain because some of the parameter values for a2 may be determined during the execution of a1 and passed as input to the execution of a2. These are referred to as "internal chain parameters." Per definition the execution of a chain terminates when either the last action terminates (i.e., completes or fails) or any of the other actions fails.

Functional features and other aspects of component controllers in illustrative embodiments will now be described in more detail with reference to FIGS. 9 through 12. The portion of the description outlines the main characteristics and functional requirements of the AMS components of Layer 1 and Layer 2 of the multi-layer application management architecture. Higher AMS layers consume the functionality exposed by Layer 2 and may integrate these into external orchestration and the user interface.

As indicated previous, component controllers in illustrative embodiments provide APIs to the higher AMS layers to harmonize the management functions of the various XuCs and to encapsulate all the required subject-matter-expert knowledge that is required to operate the XuCs. The controllers are assumed to be stateless, with state being kept in the higher layers. The connection parameters to the XuC and required credentials are included in every API call either in the payload or via URI.

A controller may leverage different interfaces to a XuC and may decide depending on the context on the best interface to leverage.

The controller REST API is broadly divided into three parts that seamlessly integrate with each other, as shown in FIG. 9.

The Type API provides information about the implemented XuC types ("type descriptors") and actions ("action descriptors") along with the related data types defined in JSON schemas.

The Query API allows the client to query information about the XuC instances (e.g., properties, states, components and available actions).

The Action API is used by the client to execute actions against the XuC instances.

Figure 10:
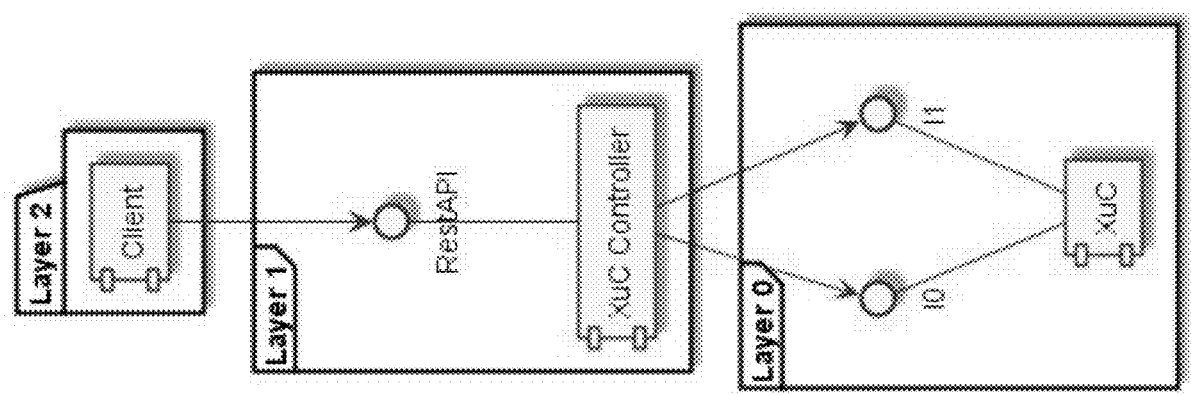
FIG. 10 shows an example of a component controller in an illustrative embodiment.

FIG. 10 illustrates one possible embodiment of a component controller of Layer 1, the component control layer. Component controllers provide APIs to the higher AMS layers to harmonize the management functions of the various XuCs. The controllers are illustratively stateless, with state being kept in the AMS only in higher layers. As shown in the figure, a client in Layer 2 communicates with an XuC controller of Layer 1 via a REST API. The XuC controller communicates with the corresponding XuC in Layer 0.

The REST API of the component controller in illustrative embodiments is standardized to support the particular set of features listed below. A given "standardized API" as that term is broadly used herein is intended to encompass an API that conforms to a particular designated set of features. The features in some cases may be reviewed as "requirements," but it should be understood that other embodiments can utilize a different set of requirements or other features for standardization of an API.

It is therefore to be appreciated that the particular listings of features provided below and elsewhere herein are not limitations, but are instead possible features of illustrative embodiments. A given embodiment can include only subsets of the listed features, and may include additional or alternative features not explicitly listed.

In the following description, listed features are once again numbered using the format x.y, where x denotes the layer number, and y denotes the feature number. It should be understood that the particular numbered features below relating to functionality for Layers 1 and 2 are distinct from similarly-numbered features provided elsewhere herein for other functionality of those layers.

1.1: The API lists all available XuC types and provides descriptions of those ("type descriptors").

1.2: The API lists all available actions applicable to a XuC type along with input/output metadata according to the generalized action semantics (the "action descriptor"); in the context of a specific XuC the API lists all actions available for that specific XuC depending on its type and current state.

1.3: The API lists all directly controllable components (aka "instances") searchable by attribute (such as ID).

1.4: Provided it is technically feasible the API lists all indirectly controllable components (also called "instances") contained in a directly controllable component searchable by attribute; this is recursive which means that such a component may contain yet another component, and so on; the API also lists types that are components of a given type.

1.5: The API is able to form and interpret unique resource IDs of the controlled components; these may be human readable by employing appropriate naming conventions 1.6: The API returns the actual state and configuration data of a component along with its metadata.

1.7: The API allows the execution of an action ("run" for synchronous and "trigger" for asynchronous execution); note that actions are assumed to be idempotent.

1.8: Provided it is technically feasible, the API continuously auto-discovers all components in its control scope so that no static knowledge about these have to be configured into the controller. It is assumed that the XuC connection data in the API payload is sufficient for unambiguously determining the control scope (i.e., the governed components) and for discovery. The data may be cached for performance reasons.

1.9: The controller writes log information during action execution controlled by an execution parameter for logging level (0 means no log); the log includes reference to a task ID that is provided by the Layer 2 entity that calls the controller API.

1.10: The controller should cancel a query or an action after the timeout (execution parameter) elapsed.

1.11: The controller should provide an SDK for Java and for Python.

1.12: The API base URL should contain a namespace for the API provider and version of the API, for example: https:// . . . /virtustream/v1/.

TABLE 1 in the Appendix shows examples of APIs and their respective functions in support of the above-listed features. Certain features are illustratively referred to as "requirements" in the context of TABLE 1.

With regard to control scope and auto-discovery, the caller of the API passes over connection data to the XuCs as well as required credentials. The set of all components to which the controller is able to connect as per the connection and credentials data is referred to herein as the "control scope" (or just "scope") of the controller.

For a controller that controls SAP NetWeaver systems of type ABAP, for example, the control scope can be determined by passing a hostname and an RFC-login enabled ABAP user. The hostname refers to a server that hosts the message servers of n (usually 1) SAP systems. The controller may scan the message server ports to auto-discover all n SAP systems or there may be another mechanism to discover the systems. All these systems belong to the control scope, all clients for which the ABAP user is valid belong to the control scope and if the controller is able to control ABAP users then ABAP users are in the control scope provided the ABAP user has appropriate authorization.

All components are identifiable by an ID that is unique within the scope of a controller. As these IDs will be part of the API URLs they are URL conforming. The controller may create universally unique IDs ("UUIDs") for the components or preferably construct a unique ID that is interpretable by a human expert. As components can be recursively nested (e.g., via part-of relations) the IDs are assumed to be recursively constructed. The constructed ID may then be percent-encoded.

TABLE 2 in the Appendix shows examples of component IDs constructed in the manner described above for an ABAP system.

Details relating to context sensitive availability of actions and part-of relations will now be described.

For the client of an L1 controller it is crucial to determine which XuC types are actually implemented by any installed controller and which actions can be invoked on instances of these types. As indicated previously, XuCs may be nested which means that there may be things under control which are contained in other things that are under control. Such a case in point is an SAP NetWeaver system that has components such as so-called "ABAP clients" (similar to tenants) or components such as a relational database management system (RDBMS) that stores the data of the SAP NetWeaver system. Like the system to which they belong, these components are also controlled using the techniques disclosed herein. It is assumed that the controller is able to handle these part-of relationships correctly. The REST API should also enable the client to retrieve that information.

Figure 11:
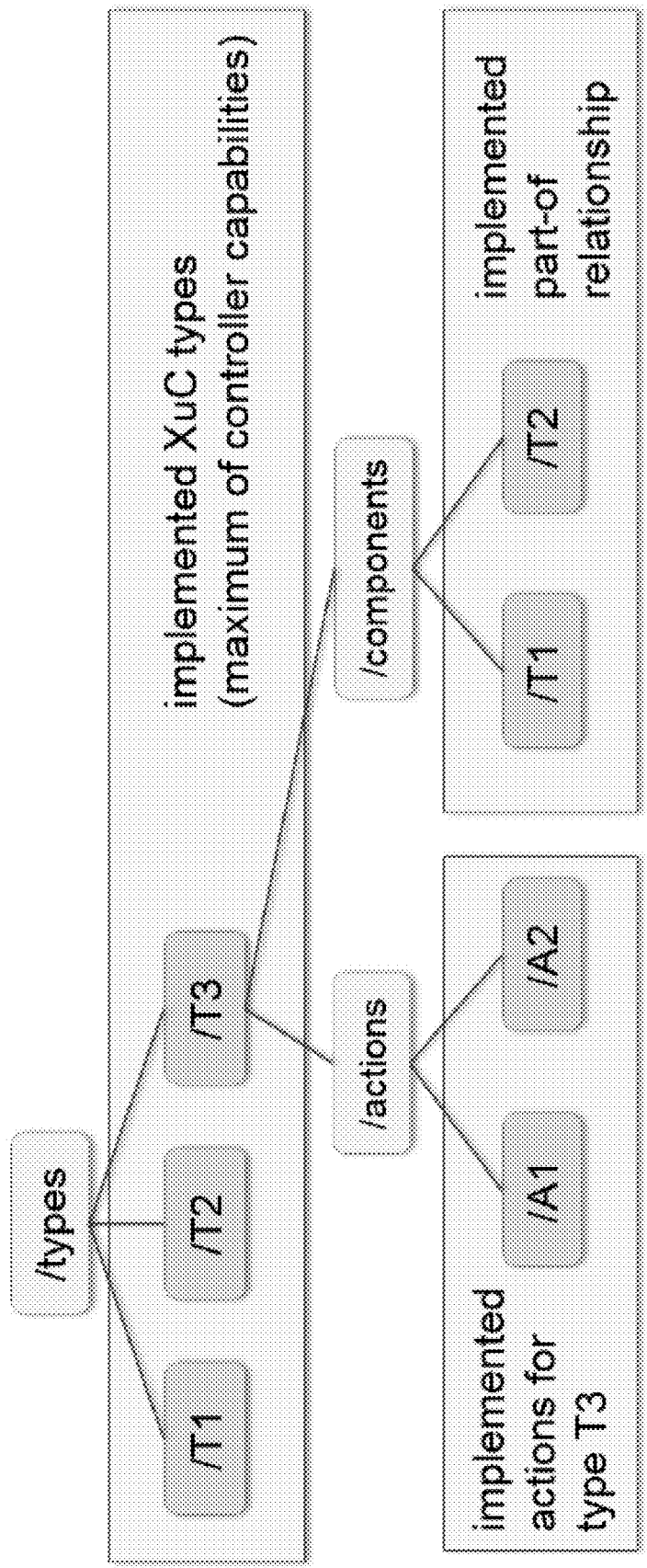
FIG. 11 shows a more detailed view of a type API of a component controller.

FIG. 11 shows an example for a controller that implements three XuC types, T1, T2 and T3. T1 and T2 are parts of T3, such as an RDBMS that is part of an SAP NetWeaver system. T3 also implements actions A1 and A2. The REST API of the controller would reflect these facts as depicted in FIG. 11.

However, the part-of relationships and available actions will depend on the actual configuration of a particular instance of a type. To reflect that complexity, the controller in some cases might have to implement a sophisticated type hierarchy that could impede maintainability, understandability and adoption. In the context of the above example, the controller may implement "broad" types such as "SAPSystem," "ABAPClient," "SAPLogonGroup" and "RDBMS" and entail that the last three are all components of "SAPSystem." However, whether an SAPSystem indeed contains "ABAP clients" depends on the flavor of the installed system (ABAP versus JAVA). To reflect that properly the controller would have to provide XuC types for the different flavors which makes the handling much more complicated.

Figure 12:
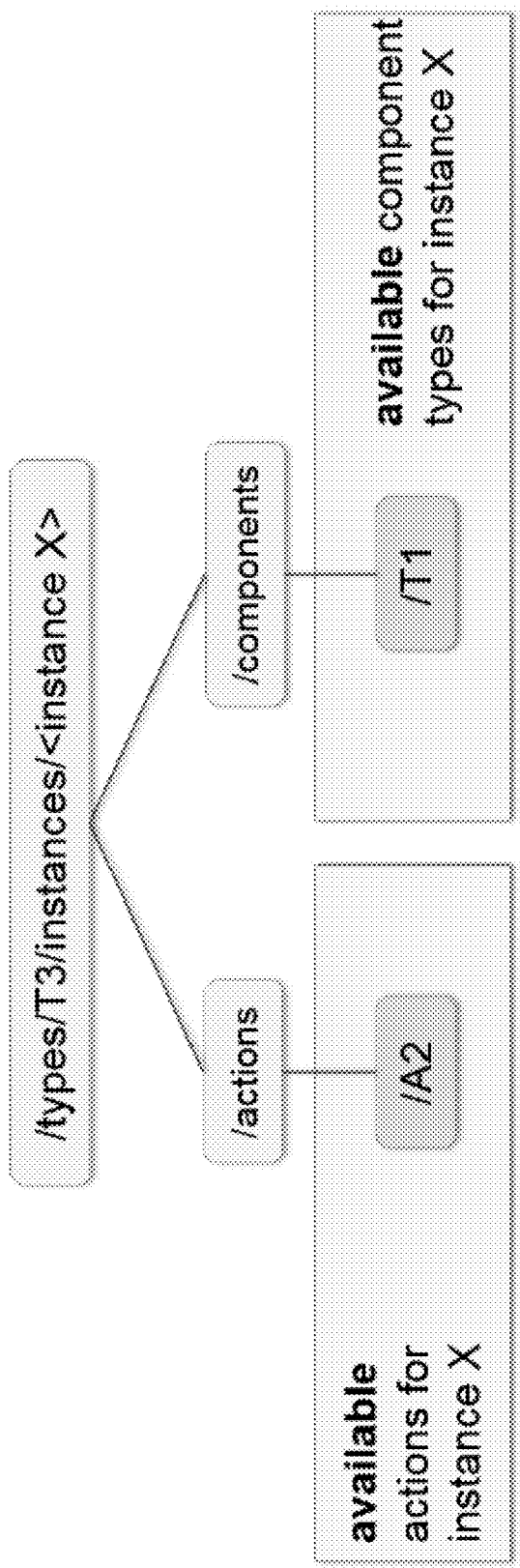
FIG. 12 shows a more detailed view of a query API of a component controller.

Instead, the present embodiment utilizes a different approach: while the above relations entailed in the Type API of the controller have to be interpreted as the implemented relations, the Query API will retrieve the actually available actions and component types based on the context (configuration and state) of the instance of the XuC type. Assume that the type T3 has an instance X which is configured in such a way that only T1 qualifies as a valid component and also its current state (and configuration) is such that only action A2 would be applicable. The Query API then reflects this as shown in FIG. 12.

In some embodiments, in order to enhance usability of the API, the API is configured to conform to the HATEOAS (Hypermedia as the Engine of Application State) paradigm in the manner shown in TABLE 3 in the Appendix.

Additional examples of component controller functionality will now be described with reference to FIGS. 13-18.

References in XuC Type Collection Assume the controller supports the two XuC types T1 whose instances follow schema t_t1 and T2 whose instances follow schema t_t2. When returning the array of supported types, the relationship "self" points to the actual type, "schema" to the schema URL containing the type's and instance's data types, "data-type" to the data type of the type, "instance-data-type" to the data type of the instances and "actions" to the URL listing all implemented actions for that type. Also, reference is made to component URL.

FIG. 13 shows an example result of the query http://<controller endpoint>/types.

References in XuC Type Descriptors

When the data of a particular type is requested then the above links are provided in addition to the data that describes the type ("type descriptor") such as a textual description and additional attributes.

FIG. 14 shows an example result of the query http://<controller endpoint>/types/T1.

References in Instance Collection

Assume there is a XuC type T and an instance 1234 and abcd. The relationship "self" points to the actual URL of the instance, "schema" to the instance schema, "data-type" to the instance data type, "actions" to the URL that lists all available actions for the instance and "components" to the component URL.

FIG. 15 shows an example result of the query http://<controller endpoint>/types/T/instances.

References in Instance

For the instance, the relationship "type" points to the URL of the type and schema to the schema of the instance.

FIG. 16 shows an example result of the query http://<controller endpoint>/types/T/instances/1234.

References in Action Collection

Assume that the type T allows the actions A, B and C. At time of call the instance 1234 only allows for actions A and C. The relationship "type" points to the action descriptor that includes the metadata as per the generalized action semantics, the relationship "self" points to the action in the context of the instance and the relationship "executedBy" points to the URL with which the execution would be invoked.

Figure 17:
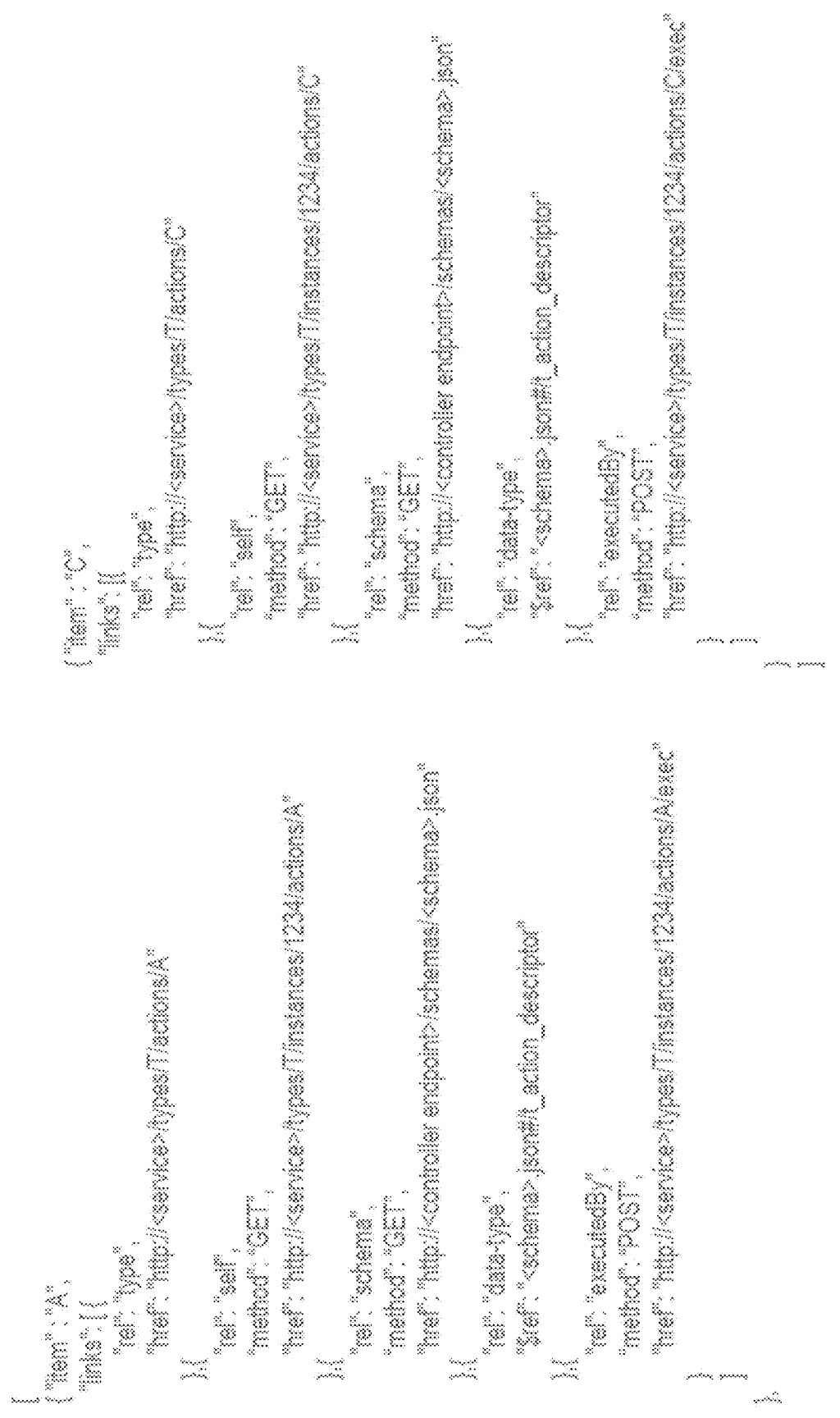

FIG. 17 shows an example result of the query http://<controller endpoint>/types/T/instances/1234/actions.

References in Action Descriptors

Action descriptors specify action metadata such as pre- and post-conditions, input defaults and input/output data types. The latter refer to the schema that is mentioned in the schema link as in the example below. Assume that the action A of type T uses the input data type t_action_a_input and output data type t_action_a_output, respectively, and that both data types are defined in <schema>.json.

FIG. 18 shows an example result of the query http://<controller endpoint>/types/T/actions/A.

In some embodiments, component controllers implemented using standardized APIs are configured to return standardized HTTP responses. Such a configuration is another example of a "standardized API" as that term is broadly used herein.

TABLE 4 in the Appendix defines example HTTP response codes that the component controllers returns in illustrative embodiments. Certain scenarios may be semantically treated as errors of the controller client side.

Example application controllers in illustrative embodiments include an SAP system controller and a database system controller.

TABLE 5 in the Appendix shows example API calls with output for an SAP ABAP controller that performs actions on SAP NetWeaver systems.

TABLE 6 in the Appendix shows example functions of a controller that executes actions on relational database management systems such as ORACLE or SAP HANA.

Additional details relating to system control in Layer 2 of the multi-layer application management architecture will now be described.

As the Layer 1 controllers are assumed to be stateless in illustrative embodiments, such controllers are not able to cover all aspects of the previously-described generalized action semantics. Accordingly, an orchestration engine of Layer 2 in some embodiments is equipped with a task machine to ensure proper state handling. It will also control retries according to execution parameters.

The Layer 2 orchestration engine in illustrative embodiments is more particularly configured in accordance with the particular set of features listed below. Again, these are example features and additional or alternative requirements or other features may be implemented in a Layer 2 orchestration engine in other embodiments.

2.1: The orchestration engine interacts with the component controller API that exposes actions of Layer 1 to higher layers.

2.2: The orchestration engine executes actions as managed tasks so that the state of an action execution can be queried via API; each task is assigned a unique ID that is passed as input to the component controller for correlation purposes (such as identifying the L2 task in L1 controller log files).

2.3: The orchestration engine should handle retries of executions as per the related execution parameter.

2.4: The orchestration engine should manage runtime statistics of action executions so that run times of future actions can be predicted (and eventually timeout values could be intelligently adjusted).

2.5: The orchestration engine should prevent parallel execution of actions on the same XuC.

2.6: The orchestration engine should log each execution of an action along with timestamp, task ID, input and output (with sensitive information hidden). It should log each status change of an action.

2.7: The orchestration engine provides all required XuC credentials to the controller.

As indicated previously, the foregoing list and other listings of features herein are not limitations, but are instead possible features of illustrative embodiments. A given embodiment can include only subsets of the listed features, and may include additional or alternative features not explicitly listed.

Additional features of component controllers in illustrative embodiments will now be described with reference to FIGS. 19 and 20.

In these embodiments, a component controller more specifically referred to as App Controller is implemented as an application management microservice having a standardized API of the type described elsewhere herein. The App Controller microservice is more particularly implemented as part of an xStream App Director stack. The implementation is focused on SAP systems (ABAP and J2E) and HANA databases. Therefore the only implemented XuC types in this embodiment are: SAPSystem, SAPSystemInst, DBSystem and DBSystemInst. Component types are SQLUser and ABAPClient.

The microservice was implemented as a 3.0 compatible servlet container on Java 8 leveraging the Apache Commons as well as the Spring Framework, and running in Tomcat. It uses the external SAP JCO library for RFC connections to SAP ABAP systems as well as JDBC drivers of the connected RDBM systems (SAP HANA is assumed to be the only database system in this embodiment).

The external libraries are assumed to be deployed during install time under the terms and conditions that the user has with the software providers.

The App Controller in some embodiments also supports a "simulation mode" in which the data of the XuCs are mocked via YAML files which simplifies integration testing.

The microservice comprises the following Java projects:

1. Appcontrol-domain: basic data types generated from data definition files (RAML10).

2. Appcontrol-rest: the REST interface including control scope handling.

3. Appcontrol-op: implementation of the operations (instance data, actions).

4. Appcontrol-utilities: project independent helper classes.

The microservice WAR file is built via Gradle out of these projects and deployed into Tomcat via RPM. The microservice also runs in a Docker container.

Aspects of XuC IDs and control scope handling in the App Controller microservice will now be described.

In an illustrative embodiment, each XuC type is associated with a naming convention for its unique ID. For example, the SAP SID is used as the XuC ID for instances of type SAPSystem.

The control scope of the service is specified by the client in the HTTP header. For each XuC interface the interface parameters need to be specified. For example, for type SAPSystem, the interface parameters illustratively include: prot (protocol such as HTTP), server (host name or IP address), user, password, and instnum (so-called SAP instance number from which the TCP port is derived).

XuCs of that type have two interfaces: sapcontrol and sapjco. The latter requires an additional parameter "client" specifying the ABAP client against which the queries should be executed.

As an example, FIG. 19 illustrates the control scope of an SAP System with ID "S01" on server "s00001" and instance number "00" and sapcontrol user/password "s01adm"/"somepassword" and sapjco user/password "SAP*"/"somepassword."

The App Controller microservice includes functionality for watchdog handling during API request processing, as will now be described with reference to FIG. 20. This figure includes a signal flow diagram for an annotation and aspect based watchdog mechanism to limit execution time of synchronous remote operations was implemented, in order to support the previously-described component controller requirement 1.10 relating to cancellation of queries and actions after timeout.

Figure 20:
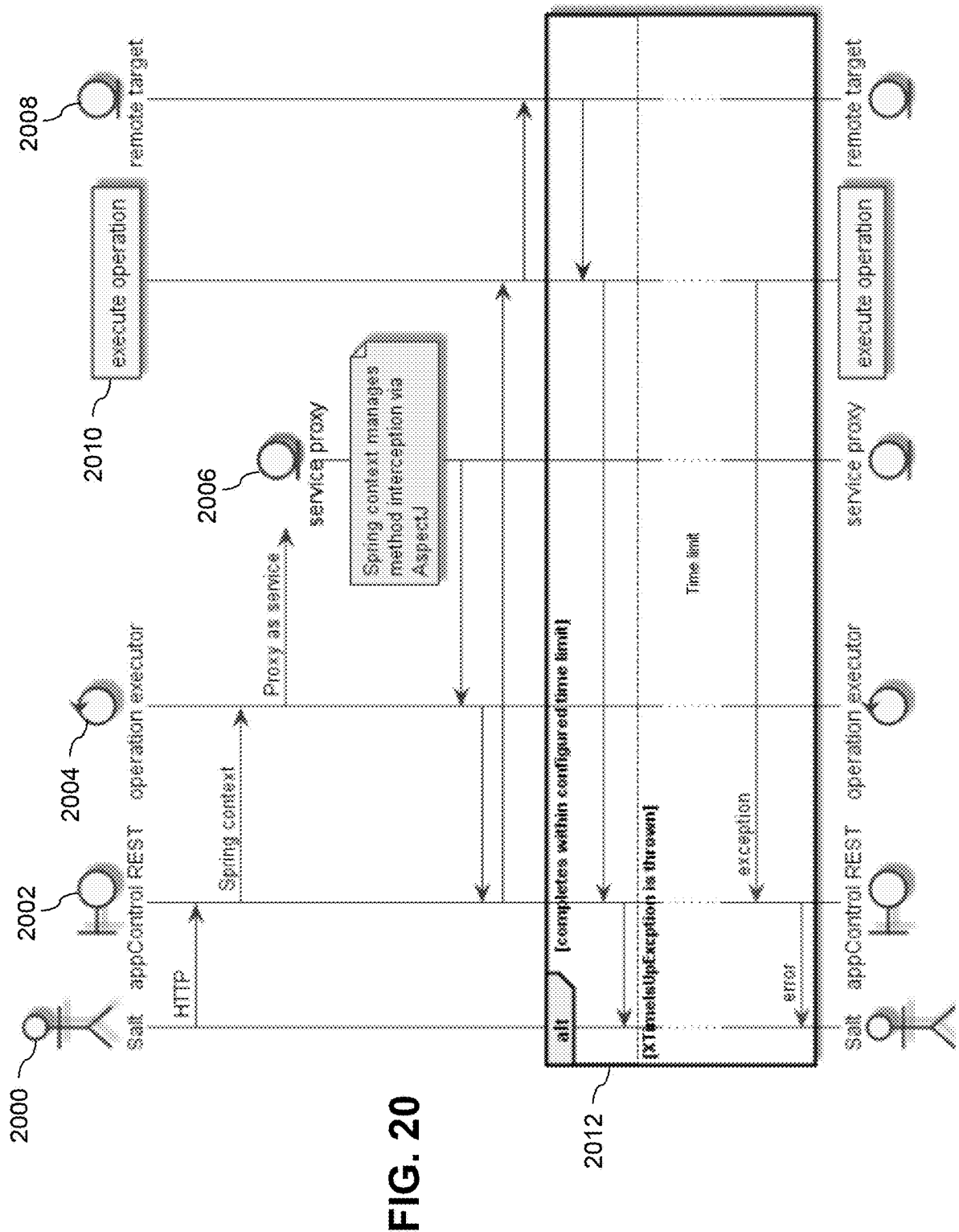
FIG. 20 is a signal flow diagram illustrating the operation of a watchdog mechanism in an illustrative embodiment.

The flow diagram of FIG. 20 illustrates interactions between a Salt entity 2000, the App Controller REST API 2002, an operation executor 2004, a service proxy 2006 and a remote target 2008, relating to an operation execution 2010. The signaling associated with a time limit expiration exception is shown in box 2012.

In this embodiment, annotated methods get wrapped by an aspect and executed in a background thread with a maximum execution time set. Responsive to the time limit being reached, the thread gets interrupted and terminated with an error status. The instantiation of execution agents is provided by the Spring as IoC (inversion of control) and DI (dependency injection) Framework. The execution agents contain other objects representing certain parts of the interface of the remote systems called "service proxies." They might be generated from interface descriptors like WSDL or be hand crafted if only generic interfaces are available (like JDBC), as illustrated in FIG. 20.

Other types of watchdog mechanisms may be implemented in component controllers in other embodiments.

With regard to auto-discovery, some XuCs are automatically discovered and therefore are not part of the control scope: SAPSystemInst, DBSystemInst, ABAPClient and SQLUser. XuCs for auto-discovered components are generated by the App Controller based on naming conventions.

Additionally or alternatively, the App Controller in some embodiments is configured to provide access to the data of a tenant's SAP Landscape Directory system.

With regard to error handling in the App Controller, the App Controller is illustratively configured such that all unhandled problems will throw an exception of class XError (extension of class RuntimeException) or a class that is derived from XError. Every exception class is annotated with a HTTP response code so that the REST API knows which code to return after an exception. All exceptions are logged in the catalina.out file of the Tomcat server. TABLE 7 in the Appendix shows examples of such exception classes.

Additional operations-specific exceptions have been defined in illustrative embodiments to reflect the semantics of problems during the processing of the operations. These exception classes are derived from class RuntimeException and are annotated with hints that the REST processing layer uses to infer the HTTP status code. TABLE 8 in the Appendix shows examples of these exception classes.

In some embodiments, an App Controller of the type described above is configured to interact with a SALT Proxy for App Controller, a Python module that connects the App Controller to SaltStack. Additional details of embodiments of this type will now be described with reference to FIGS. 21 through 28.

Figure 21:
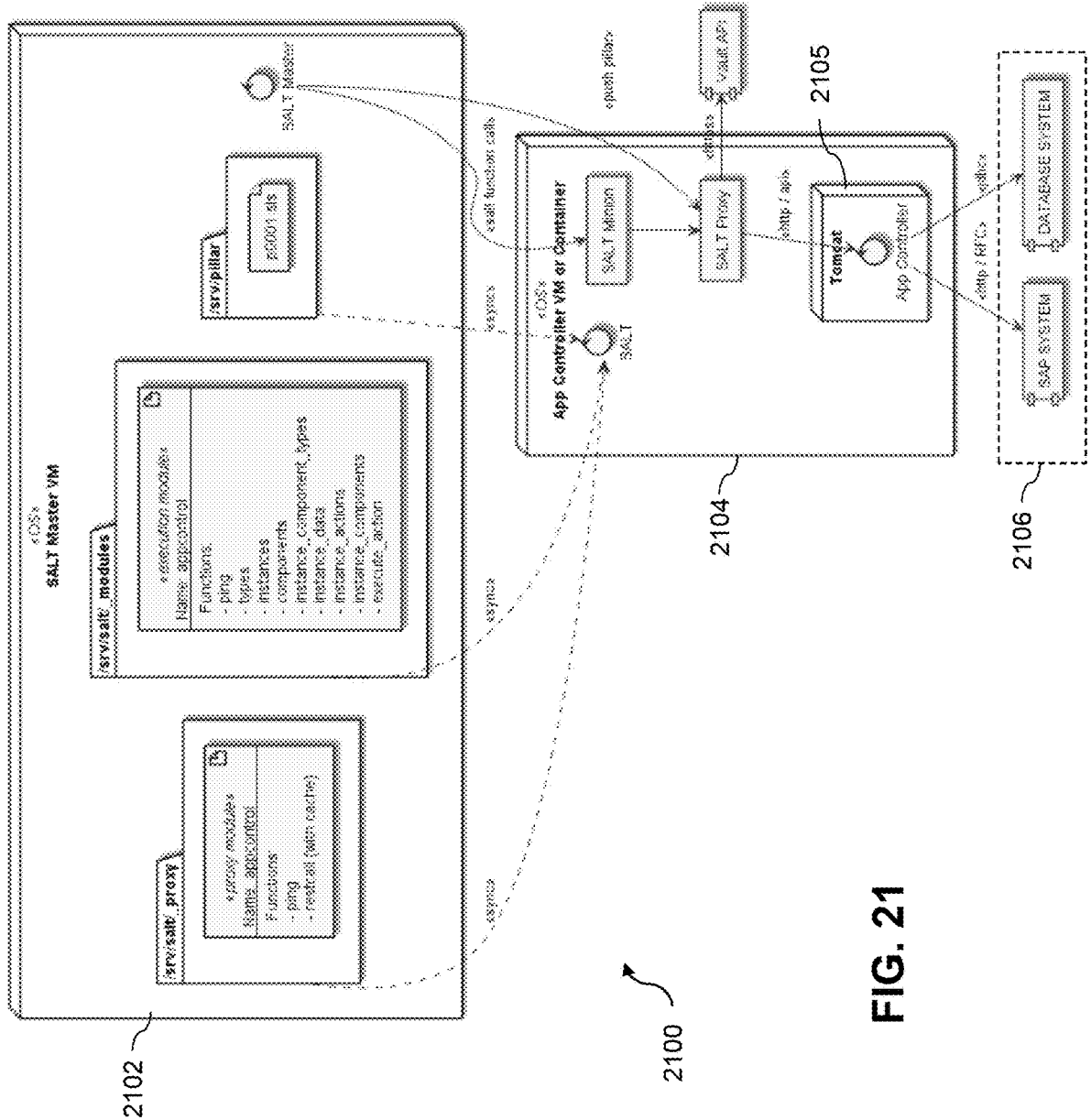
FIG. 21 illustrates the operation of a proxy for an application controller in one embodiment.

Referring initially to FIG. 21, a system 2100 comprises a Salt Master virtual machine (VM) 2102 that communicates with an App Controller VM or Docker container 2104. The App Controller is an example of what is more generally referred to herein as a "component controller." The App Controller in this embodiment is configured to control components 2106 that illustratively include an SAP system and a database system.

This embodiment utilizes an example implementation of what is more generally referred to herein as a Salt-based configuration management system.

The App Controller is connected to the Salt Master via a Salt Proxy. The Salt Master comprises a proxy module (written in Python). The proxy module implements a ping function and a generic restcall function which acts as the client of the App Controller REST API. It also implements a cache whose expiration time can be configured via Salt pillar. In some embodiments, a Hashicorp Vault server is used to store the credentials, and the proxy uses these when it constructs the control scope header.

An appcontrol module (written in Python) implements all functions that are exposed to the user (such as appcontrol.types).

One or more Salt pillar SLS file(s) are provided for encoding the proxy parameters and the control scope.

The above-noted optional Hashicorp Vault server provides the XuC credentials.

FIGS. 22 through 28 illustrate application control via Salt in this embodiment, and more particularly the manner in which certain API requirements are satisfied, including the requirements 1.1, 1.3, 1.4 and 1.6 previously described above. Although referred to in the context of the present embodiments as "requirements" of a particular standardized API used to implement a component controller, additional or alternative requirements or other features may be present in other embodiments.

The proxy is configured as per the pillar data shown in FIG. 22.

In the pillar data two systems constitute the control scope of the proxy: SAPSystem "ECU" including the interface parameters for sapcontrol and sapjco and DBSystem "HDB" with the interface parameters for sapcontrol and jdbc.

In the following examples "p0001" will be the minion ID of the proxy.

Requirement 1.1 (list all available XuC types) is leveraged by appcontrol function types shown in FIG. 23.

Requirement 1.3 (list all directly controllable components) is implemented using the appcontrol function instances shown in FIG. 24.

Requirement 1.4 states that the API lists types that are components of a given type, as illustrated in FIG. 25.

These sets of component types constitute a "maximal set." Depending on the flavor and configuration of an XuC instance the result set may just be a proper subset of the maximal set. For example, if the system J01 (not in the example control scope) was a J2EE (non ABAP) system, then the result set may be as shown in FIG. 26.

Requirement 1.4 also states that indirectly controllable targets are listed. The equivalent appcontrol function is instance components, as illustrated in FIG. 27.

As per requirement 1.6, it must be possible to query the actual state and configuration data of a thing under control, which is realized via appcontrol function instance_data, illustrated in FIG. 28.

The particular layers, characteristics, features and other system functionality described in conjunction with the diagrams of FIGS. 2 through 28 are presented by way of illustrative example only, and should not be construed as limiting the scope of the invention in any way. Alternative embodiments can use other types and arrangements of components to implement a multi-layer architecture for application management. For example, additional or alternative characteristics or other features can be provided for each of one or more of the layers of the multi-layer architecture in other embodiments.

It is also to be appreciated that application management functionality such as that described in conjunction with the diagrams of FIGS. 2 through 28 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments can provide considerable advantages over conventional application management arrangements.

For example, some embodiments provide standardized microservices for controlling components of distinct enterprise applications or other types of applications in multi-layer application management architectures of cloud-based information processing systems. Such microservices are well-suited for use with hybrid multi-tenant clouds and numerous other types of cloud-based information processing systems.

These and other embodiments simplify the provision of effective and flexible component control for multiple distinct applications of multiple tenants in hybrid multi-tenant clouds through the use of component controllers implemented as respective application management microservices each presenting a standardized API to an overlying orchestration layer as disclosed herein.

Such standardization of application management microservices for component control facilitates development of component controllers by different organizations and/or subject matter expert groups.

In some embodiments, component controllers incorporate application agnostic and powerful standardized APIs based on types, instances and actions, utilizing generalized action semantics.

These embodiments provide a standardized approach to reuse application control logic when changing configuration management frameworks.

Illustrative embodiments avoid the need for complex type hierarchies by distinguishing implemented versus available actions and part-of relations.

Moreover, component controllers in illustrative embodiments disclosed herein are not limited to use with particular vendor software products, or with corresponding limited ranges of actions.

Challenges associated with deployment of multiple distinct applications for multiple tenants in hybrid multi-tenant clouds can be advantageously avoided through the use of an application manager configured in accordance with a multi-layer application management architecture as disclosed herein.

A multi-layer application management architecture in one or more illustrative embodiments can be used as a reference architecture for a wide variety of different application management solutions.

Such a reference architecture provides completeness along multiple dimensions of application automation. For example, it covers a full stack of potentially complex application systems, including infrastructure, OS and application, through integration of specialized Layer 1 controllers that operate on all these levels.

The multi-layer architecture in some embodiments accommodates the potentially complex nature of enterprise-grade applications such as SAP NetWeaver or others by providing a dedicated layer in the architecture that is in charge of properly modeling the topology and dependencies of such systems while still being application product agnostic.

The multi-layer architecture in some embodiments supports blueprint-based application provisioning and/or disposal, as well as additional functionality such as in-life management operations including system monitoring, configuration and/or change management.

The multi-layer architecture in some embodiments provides services for atomic operations, including inherently orchestrated operations as well as operations using explicitly engineered workflow-like orchestration.

The multi-layer architecture in some embodiments provides a service for providing credentials to controlling components.

The multi-layer architecture in some embodiments formulates functional requirements that can be used to develop microservices for highly modular and flexible application management products.

The multi-layer architecture in some embodiments provides multiple extension points in respective ones of the layers, resulting in a highly-extensible platform. Such layers can be used, for example, to extend an application management solution through the use of 3rd party implementations.

The multi-layer architecture can provide further advantages in terms of non-functional product quality criteria such as those defined in ISO 25010.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 29:
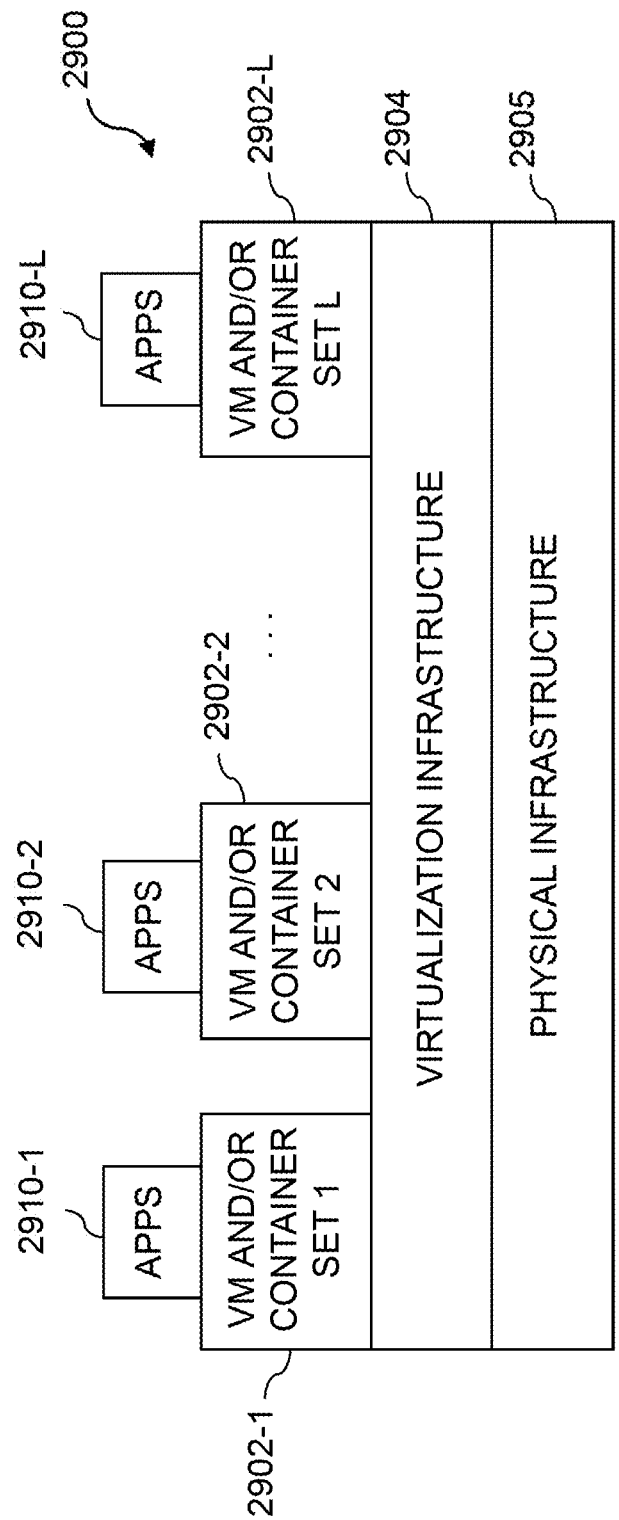
FIGS. 29 and 30 show examples of processing platforms that may be utilized to implement at least a portion of a cloud-based information processing system such as the information processing system of FIG. 1.

FIG. 29 shows an example processing platform comprising cloud infrastructure 2900. The cloud infrastructure 2900 comprises a combination of physical and virtual processing resources that may be utilized to implement at least a portion of the information processing system 100. The cloud infrastructure 2900 comprises multiple virtual machines (VMs) and/or container sets 2902-1, 2902-2, . . . 2902-L implemented using virtualization infrastructure 2904. The virtualization infrastructure 2904 runs on physical infrastructure 2905, and illustratively comprises one or more hypervisors and/or operating system level virtualization infrastructure. The operating system level virtualization infrastructure illustratively comprises kernel control groups of a Linux operating system or other type of operating system.

The cloud infrastructure 2900 further comprises sets of applications 2910-1, 2910-2, . . . 2910-L running on respective ones of the VMs/container sets 2902-1, 2902-2, . . . 2902-L under the control of the virtualization infrastructure 2904. The VMs/container sets 2902 may comprise respective VMs, respective sets of one or more containers, or respective sets of one or more containers running in VMs.

In some implementations of the FIG. 29 embodiment, the VMs/container sets 2902 comprise respective VMs implemented using virtualization infrastructure 2904 that comprises at least one hypervisor. Such implementations can provide application management functionality of the type described above for one or more application running on a given one of the VMs. For example, each of the VMs can implement component controllers for use in application management in the system 100.

An example of a hypervisor platform that may be used to implement a hypervisor within the virtualization infrastructure 2904 is the VMware® vSphere® which may have an associated virtual infrastructure management system such as the VMware® vCenter™. The underlying physical machines may comprise one or more distributed processing platforms that include one or more storage systems.

In other implementations of the FIG. 29 embodiment, the VMs/container sets 2902 comprise respective containers implemented using virtualization infrastructure 2904 that provides operating system level virtualization functionality, such as support for Docker containers running on bare metal hosts, or Docker containers running on VMs. The containers are illustratively implemented using respective kernel control groups of the operating system. Such implementations can also provide application management functionality of the type described above. For example, a container host device supporting multiple containers of one or more container sets can implement component controllers for use in application management in the system 100.

The underlying physical machines of physical infrastructure 2905 may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

Figure 30:
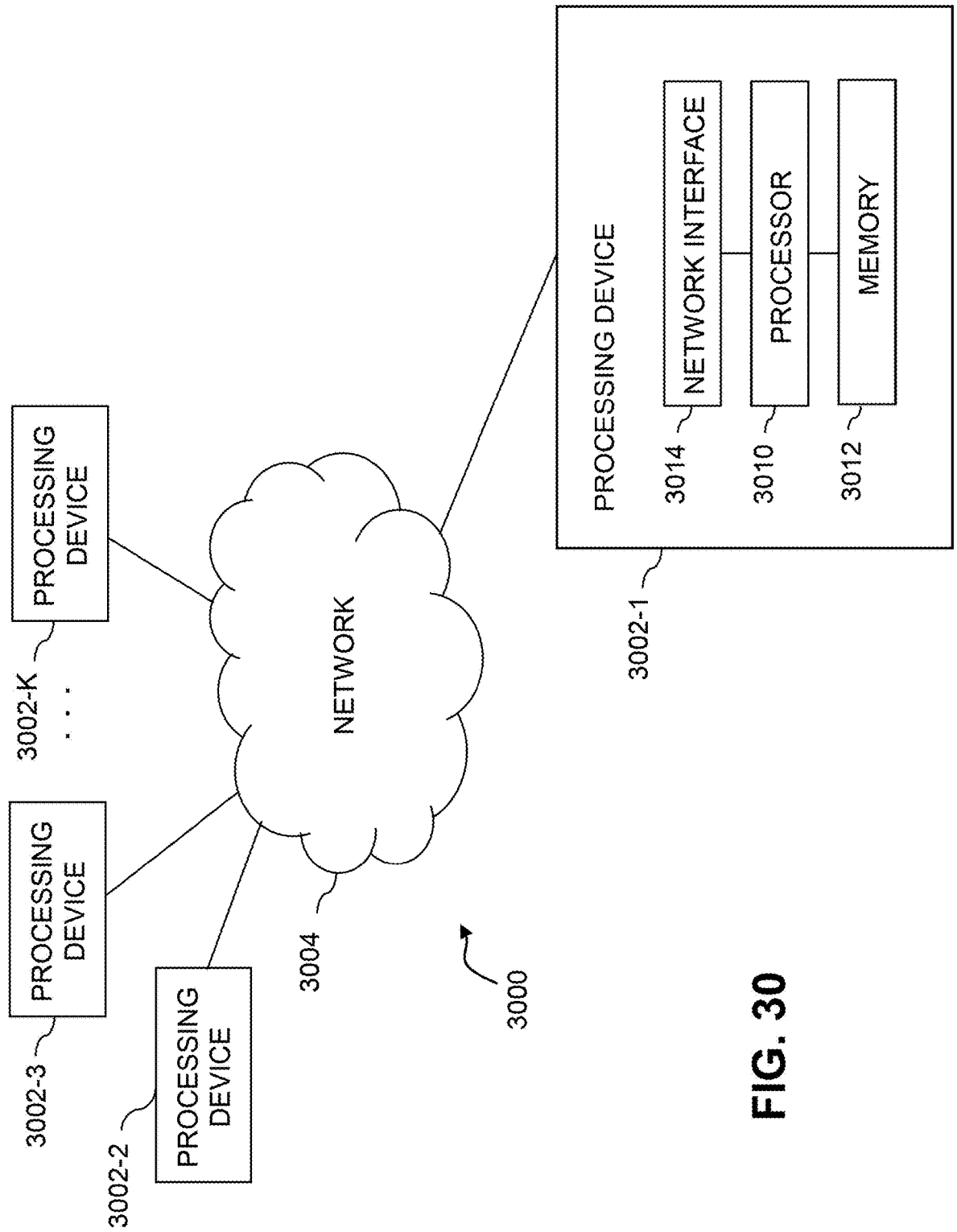

One or more of the processing modules or other components of system 100 may therefore each run on a computer, server, storage device or other processing platform element. A given such element may be viewed as an example of what is more generally referred to herein as a "processing device." The cloud infrastructure 2900 shown in FIG. 29 may represent at least a portion of one processing platform. Another example of such a processing platform is processing platform 3000 shown in FIG. 30.

The processing platform 3000 in this embodiment comprises a portion of system 100 and includes a plurality of processing devices, denoted 3002-1, 3002-2, 3002-3, . . . 3002-K, which communicate with one another over a network 3004.

The network 3004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 3002-1 in the processing platform 3000 comprises a processor 3010 coupled to a memory 3012.

The processor 3010 may comprise a microprocessor, a microcontroller, an ASIC, a field-programmable gate array (FPGA), a graphics processing unit (GPU) or other type of processing circuitry, as well as portions or combinations of such circuitry elements.

The memory 3012 may comprise random access memory (RAM), read-only memory (ROM), flash memory or other types of memory, in any combination. The memory 3012 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 3002-1 is network interface circuitry 3014, which is used to interface the processing device with the network 3004 and other system components, and may comprise conventional transceivers.

The other processing devices 3002 of the processing platform 3000 are assumed to be configured in a manner similar to that shown for processing device 3002-1 in the figure.

Again, the particular processing platform 3000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide the above-noted Docker containers or other types of LXCs.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide efficient management of applications in hybrid multi-tenant clouds and other types of cloud-based information processing systems. Also, the particular configurations of system components shown in the figures can be varied in other embodiments. Thus, for example, the particular types of processing platforms, application managers, multi-layer architectures, controllers, engines and controlled components deployed in a given embodiment and their respective configurations may be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

APPENDIX

TABLE 1

Example Component Controller API Functions and Requirements

| API | Function | Requirement |
| --- | --- | --- |
| /schemas | returns an array of all relevant schemas as json schema files | 1.1, 1.2 |
| /catalog | returns all supported XuC types along with their descriptors and actions along with their descriptors | 1.1, 1.2 |
| /types | returns an array of all supported XuC types | 1.1 |
| /types/{type_id} | returns the type descriptor | 1.1 |
| /types/{type_id}/components | lists all types that are conceptually part of the given XuC type | 1.4 |
| /types/{type_id}/actions | returns an array of the maximal set of all supported actions for that type | 1.2 |
| /types/{type_id}/actions/{action_id} | returns the action descriptor of that action | 1.2 |
| /types/{type_id}/instances | returns an array of all discovered instances of the XuC type within the control scope | 1.3 |
| /types/{type_id}/instances?key=X&value=Y | | |
| /types/{type_id}/instances/{instance_id} | returns state and configuration of the specific XuC | 1.6 |
| /types/{type_id}/instances/{instance_id}/components | lists all types that have a part of relationship to the XuC type in the context of the given instance | 1.4 |
| /types/{type_id}/instances/{instance_id}/components/{comp_type_id}<br>components/{comp_type_id}?key=X&value=Y<br>(optional filter using attributes of meta data of the type) | returns an array of all components that are part of the XuC and that belong to the given component type | 1.4 |
| /types/{type_id}/instances/{instance_id}/actions | returns an array of all actions that are actually available for the specific XuC depending on its current state | 1.2 |
| /types/{type_id}/instances/{instance_id}/actions/{action_id}/exec | executes that action on the XuC | 1.7 |

TABLE 2

Example Component IDs for an ABAP System

| ID | Type | Uniqueness |
| --- | --- | --- |
| <SAP SID> | ID of a SAP system | unique as the SIDs are unique within the control scope by convention |
| <SAP SID>-<Client Number> | ID of an ABAP client | unique as the numbers are unique within a system |
| <SAP SID>-<Client Number>-<User ID> | ID of an ABAP user | unique as the user IDs are unique within the client of a system |

TABLE 3

Example Component Controller API Conformance with HATEOAS

| Link Relation | Content |
| --- | --- |
| self | Provides URL to the resource (XuC type, XuC instance or action) |
| schema | Provides the URL to the json schema that contains the data type that describes the data that a GET request on the resource will put out |
| data-type | Provides the reference to the data type. Similar to "$ref" in json schema. |

TABLE 3-continued

Example Component Controller API Conformance with HATEOAS

| Link Relation | Content |
|---|---|
| instance-data-type | Only applicable to XuC type resources. Provides a reference to the data type of an XuC instance resource |
| actions | Provides the URL that will list all available actions (for a type or instance, respectively). |
| executedBy | Only applicable to actions. Provides the URL that will execute the action. |
| type | Only applicable to XuC instances and actions. In the context of instances it provides the URL to the type of the XuC. In the context of concrete actions (instances/<instance>/actions/<action>) it points to the URL of the actions descriptors (types/<type>/actions/<action>). |
| Components | Only applicable to types and instances. In the context of a type it points to the URL which will return the types that have a part-of relationship with the given XuC type. In the context of an instance it will list all XuC types that are actual applicable as components to the given instance. |

TABLE 4

Example Standardized HTTP Responses for Component Controller

| HTTP Response | Meaning | Scenario |
|---|---|---|
| 200 | OK | instance query or action execution was successful (except below case) |
| 201 | Created | CREATE action was successful (execution mode "run"); response includes URL of new resource |
| 404 | Not Found | resource (type, instance) not found |
| 409 | Conflict | pre-condition gate not passed |
| 500 | Internal Server Error | any uncaught exception such as NPE |
| 501 | Not Implemented | requested action is not implemented for the type |
| 502 | Bad Gateway | unexpected response from XuC |
| 504 | Gateway Timeout | timeout during query or action execution |

TABLE 5

Example API Calls and Output for SAP System Controller

| API | Output |
|---|---|
| /types | JSON Array of XuC types such as "SAPSystem", "SAPSystemInst", "SAPSystemDB", "ABAPClient", "ABAPLogonGroup" |
| /types/SAPSystem | JSON Object with description of SAPSystem type, e.g. { . . . "description": "The SAPSystem type is used to control all SAP NetWeaver systems of types ABAP, J2E and Dual Stack", . . . } |
| /types/ABAPClient | JSON Object with description of ABAPClient type, e.g. { . . . "description": "The ABAPClient type is used to provide client-dependent actions against a specific client of an SAP NetWeaver system of type ABAP.", . . . } |
| /types/SAPSystem/components | JSON Array with types that have a part-of relationship to the type "SAPSystem", i.e. "SAPSystemInst", "SAPSystemDB", "ABAPClient", "ABAPLogonGroup" |
| /types/SAPSystem/actions | JSON Array listing all implemented actions of type "SAPSystem", for example "startup", "shutdown", "reboot", "createClient" etc. |
| /types/ABAPClient/actions | JSON Array listing all implemented actions of type "ABAPClient", for example "createUser", "deleteUser", "lockAllUserAccounts", "suspendAllBatchJobs" |
| /types/SAPSystem/actions/startup | JSON Object that specifies that action ("action descriptors") |
| /types/SAPSystem/instances | JSON Array with all SAP systems in the control scope of the controller |
| /types/SAPSystem/instances/ECU | JSON Object containing system data of SAP system with SID "ECU" including attributes "sap_sid", "message_server_fqdn", "system_type" and "run_state"; "system_type" is an enumeration out of ["ABAP", "JAVA", "DUAL"] |
| /types/SAPSystem/instances/ECU/components | JSON Array with types that have a part-of relationship with regard to that instance. For example ABAPClient would only be in that array if "ECU" was an ABAP system. |
| /types/ABAPSystem/instances/ECU/components/ABAPClient | JSON Array listing all clients of the ABAP system "ECU", e.g. "ECU-000", "ECU-001", "ECU-100" |
| /types/ABAPClient/instances/ECU-000 | JSON Object with attributes of client 000 in system "ECU" |
| /types/SAPSystem/instances/ECU/components/SAPSystemInst | JSON Array with all installed (dialog and other) instances of system "ECU" |
| /types/SAPSystem/instances/ECU/actions | JSON Array with all actions that are currently applicable to system "ECU" |
| /types/SAPSystem/instances/ECU/actions/startup/exec | Will execute the "startup" action on system "ECU" if pre conditions are met. |

TABLE 6

Example API Calls and Output for Database System Controller

| API | Output |
|---|---|
| /types | JSON Array of XuC types such as "DBSystem", "DBInstance", "DBProcess", "DBDatabase", "DBBackup" |
| /types/DBSystem/components | JSON Array with component types that are part of "DBSystem": "DBInstance", "DBProcess", "DBDatabase" |
| /types/DBInstance/actions | JSON Array of implemented actions for type "DBSystem", such as "startup" or "shutdown" |
| /types/DBSystem/instances | JSON Array with all database systems in the control scope of the controller |
| /types/DBSystem/instances/ORA1 | JSON Object with properties and states of database system "ORA1" |
| /types/DBSystem/instances/ORA1/components/DBProcess | JSON Array listing all currently running processes (SQL, jobs, etc.) |
| /types/DBSystem/instances/ORA1/components/DBInstance | JSON Array listing all installed instances that belong to the system "ORA1", e.g. "ORA1-server4711", "ORA1-server4712" |
| /types/DBInstance/instances/ORA1-server4711/actions/startup/exec | Will execute the "startup" action on DB-instance "ORA1-server4711" if pre conditions are met. |

TABLE 7

Example Exception Classes for Error Handling in REST Module

| Exception Class | Related HTTP Code | Example |
|---|---|---|
| XError | INTERNAL_SERVER_ERROR (500) | Any exception in the App Controller that is unexpected. |
| XNoControlScope | BAD_REQUEST | Client calls App Controller without control scope header |
| XNotFound | NOT_FOUND (404) | Query /types/SAPSystem/instances/HS1 but HS1 not in control scope |
| XRequestData | BAD_REQUEST | Only if internal methods are called with missing parameter |
| XTimeout | REQUEST_TIMEOUT (408) | Query of XuC data takes longer than timeout parameter |
| XType | NOT_FOUND (404) | Query /types/FooBar but type "FooBar" is not implemented |
| XUnknownFeature | NOT_FOUND (404) | Execution of unknown action |

TABLE 8

Example Exception Classes for Error Handling in Operations Module

| Exception Class | Related HTTP Code (hint) | Example |
|---|---|---|
| XJco | BAD_GATEWAY (502) | Any exception in the App Controller during a SAP JCO call to an SAP ABAP system |
| XSapControl | BAD_GATEWAY (502) | Any exception in the App Controller during an http call to an SAP system's controller |
| Xjdbc | BAD_GATEWAY (502) | Any exception in the App Controller during a JDBC call to a database system |
| XUnknownAction | NOT_FOUND (404) | URL contains an undefined action |

What is claimed is:

1. An apparatus comprising:

a processing platform comprising a plurality of processing devices each comprising a processor coupled to a memory;

the processing platform being configured to implement at least a component control layer of a multi-layer application management architecture for a plurality of applications comprising controlled components;

wherein the applications are managed at least in part utilizing interactions between the component control layer and an overlying orchestration layer of the multi-layer application management architecture;

the component control layer comprising at least one component controller configured to interface with one or more of the controlled components;

wherein the component controller is implemented as an application management microservice presenting a standardized application programming interface to the orchestration layer; and wherein the standardized application programming interface of the application management microservice implementing the component controller is configured to permit queries on state and configuration of the one or more controlled components and execution of actions against the one or more controlled components.

2. The apparatus of claim 1 wherein different instances of the component controller are utilized by respective ones of at least first and second different configuration management systems associated with the orchestration layer.

3. The apparatus of claim 2 wherein at least one of the configuration management systems comprises a Salt-based configuration management system.

4. The apparatus of claim 1 wherein the component controller is remotely accessible from one or more other processing platforms via a service proxy.

5. The apparatus of claim 1 wherein different instances of the same controlled component for distinct applications are controlled utilizing respective corresponding instances of the component controller.

6. The apparatus of claim 1 wherein the standardized application programming interface of the application management microservice implementing the component controller comprises:

a type application programming interface configured to return type information characterizing the one or more controlled components;

a query application programming interface configured to query state information and available actions for the one or more controlled components; and an action application programming interface configured to allow actions against the one or more controlled components.

7. The apparatus of claim 1 wherein the component controller is implemented as a stateless controller configured via its standardized application programming interface to provide the orchestration layer with visibility into state information of the one or more controlled components in a standardized manner.

8. The apparatus of claim 1 wherein the component control layer comprises:

a plurality of application controllers configured to control respective ones of the applications; and at least one operating system controller configured to control an operating system of at least one host device utilized to execute the applications.

9. The apparatus of claim 1 wherein the component control layer comprises at least first and second distinct component controllers configured to interface with respective first and second distinct sets of controlled components with each set comprising one or more of the controlled components, wherein the component controllers are implemented as respective application management microservices each presenting a standardized application programming interface to the orchestration layer.

10. The apparatus of claim 9 wherein the first and second sets of controlled components comprise respective first and second distinct applications.

11. The apparatus of claim 9 wherein the first and second sets of controlled components comprise respective different portions of a given one of the applications.

12. The apparatus of claim 1 wherein the orchestration layer comprises a plurality of system model instances implemented for respective ones of a plurality of tenants of at least one cloud provided at least in part by the processing platform, the orchestration layer comprising a plurality of orchestration engines each associated with a different one of a plurality of application management domains and each configured to interact with a plurality of component controllers of the component control layer in order to provide services that utilize controlled components of at least one system under control.

13. The apparatus of claim 1 wherein the orchestration layer comprises a system control and inner orchestration layer, and the multi-layer application management architecture further comprises an access and routing layer and an external system orchestration layer, the external system orchestration layer comprising at least one outer orchestration engine that executes operations in the system control and inner orchestration layer across multiple tenants via at least one access point of the access and routing layer.

14. A method comprising:

implementing at least a component control layer of a multi-layer application management architecture for a plurality of applications comprising controlled components; and managing the applications at least in part utilizing interactions between the component control layer and an overlying orchestration layer of the multi-layer application management architecture;

the component control layer comprising at least one component controller configured to interface with one or more of the controlled components;

wherein the component controller is implemented as an application management microservice presenting a standardized application programming interface to the orchestration layer;

wherein the standardized application programming interface of the application management microservice implementing the component controller is configured to permit queries on state and configuration of the one or more controlled components and execution of actions against the one or more controlled components; and wherein the method is performed in at least one processing platform comprising a plurality of processing devices each comprising a processor coupled to a memory.

15. The method of claim 14 wherein the component control layer comprises at least first and second distinct component controllers configured to interface with respective first and second distinct sets of controlled components with each set comprising one or more of the controlled components, wherein the component controllers are implemented as respective application management microservices each presenting a standardized application programming interface to the orchestration layer.

16. A computer program product comprising a non-transitory processor-readable storage medium having stored therein program code of one or more software programs, wherein the program code when executed by at least one processing platform comprising a plurality of processing devices causes the processing platform:

to implement at least a component control layer of a multi-layer application management architecture for a plurality of applications comprising controlled components; and to manage the applications at least in part utilizing interactions between the component control layer and an overlying orchestration layer of the multi-layer application management architecture;

the component control layer comprising at least one component controller configured to interface with one or more of the controlled components;

wherein the component controller is implemented as an application management microservice presenting a standardized application programming interface to the orchestration layer; and wherein the standardized application programming interface of the application management microservice implementing the component controller is configured to permit queries on state and configuration of the one or more controlled components and execution of actions against the one or more controlled components.

17. The computer program product of claim 16 wherein the component control layer comprises at least first and second distinct component controllers configured to interface with respective first and second distinct sets of controlled components with each set comprising one or more of the controlled components, wherein the component controllers are implemented as respective application management microservices each presenting a standardized application programming interface to the orchestration layer.

18. The computer program product of claim 16 wherein the standardized application programming interface of the application management microservice implementing the component controller comprises:

a type application programming interface configured to return type information characterizing the one or more controlled components;

a query application programming interface configured to query state information and available actions for the one or more controlled components; and an action application programming interface configured to allow actions against the one or more controlled components.

19. The computer program product of claim 16 wherein the orchestration layer comprises a system control and inner orchestration layer, and the multi-layer application management architecture further comprises an access and routing layer and an external system orchestration layer, the external system orchestration layer comprising at least one outer orchestration engine that executes operations in the system control and inner orchestration layer across multiple tenants via at least one access point of the access and routing layer.

20. The method of claim 14 wherein the orchestration layer comprises a system control and inner orchestration layer, and the multi-layer application management architecture further comprises an access and routing layer and an external system orchestration layer, the external system orchestration layer comprising at least one outer orchestration engine that executes operations in the system control and inner orchestration layer across multiple tenants via at least one access point of the access and routing layer.

\* \* \* \* \*